US00RE48441E

(19) United States
(12) Reissued Patent
Earnshaw et al.

(10) Patent Number: US RE48,441 E
(45) Date of Reissued Patent: *Feb. 16, 2021

(54) METHOD AND SYSTEM FOR HANDLING HARQ OPERATIONS DURING TRANSMISSION MODE CHANGES

(71) Applicant: BlackBerry Limited, Waterloo (CA)

(72) Inventors: Andrew Mark Earnshaw, Kanata (CA); Takashi Suzuki, Tokyo (JP); Zhijun Cai, Ashburn, VA (US); Youn Hyoung Heo, San Jose, CA (US)

(73) Assignee: BlackBerry Limited, Waterloo (CA)

( * ) Notice: This patent is subject to a terminal disclaimer.

(21) Appl. No.: 15/967,380

(22) Filed: Apr. 30, 2018

Related U.S. Patent Documents

Reissue of:
(64) Patent No.: 8,578,233
Issued: Nov. 5, 2013
Appl. No.: 13/747,146
Filed: Jan. 22, 2013

U.S. Applications:
(63) Continuation of application No. 14/933,789, filed on Nov. 5, 2015, now Pat. No. Re. 46,821, which is an
(Continued)

(51) Int. Cl.
*H03M 13/00* (2006.01)
*H04L 1/18* (2006.01)
*H04W 72/12* (2009.01)

(52) U.S. Cl.
CPC ..... *H04L 1/1874* (2013.01); *H04L 1/1812* (2013.01); *H04W 72/1284* (2013.01)

(58) Field of Classification Search
CPC . H04L 1/1812; H04L 1/1874; H04W 72/1284
(Continued)

(56) References Cited

U.S. PATENT DOCUMENTS 7,584,397 B2 9/2009 Terry
7,764,661 B2 7/2010 Heo et al.
(Continued)

FOREIGN PATENT DOCUMENTS

CA 2638104 9/2008
EP 1507352 2/2005
(Continued)

OTHER PUBLICATIONS

International Preliminary Report on patentability dated May 24, 2012, in corresponding PCT patent application No. PCT/CA2010001784.
Written Opinion of the International Searching Authority dated Feb. 2, 2011, in corresponding PCT patent application No. PCT/CA2010001784.
(Continued)

*Primary Examiner* — William H. Wood
(74) *Attorney, Agent, or Firm* — Fish & Richardson P.C.

(57) ABSTRACT

A method and device for handling hybrid automatic repeat request ('HARQ') operations during transmission mode changes, the method detecting a transmission mode change; and manipulating an HARQ process buffer based on the detecting. Further, a method and network element for handling hybrid automatic repeat request ('HARQ') operations during transmission mode changes, the method checking when a user equipment is in a transmission mode uncertainty window; and blocking communications to the user equipment or utilizing a downlink control information format 1A for communications to the user equipment.

21 Claims, 18 Drawing Sheets

Related U.S. Application Data application for the reissue of Pat. No. 8,578,233, which is a continuation of application No. 12/538,016, filed on Aug. 7, 2009, now Pat. No. 8,386,875.

(58) Field of Classification Search
USPC ..... 714/751
See application file for complete search history.

(56) References Cited

U.S. PATENT DOCUMENTS

| | | | | |
|---|---|---|---|---|
| 7,948,941 | B2 | 5/2011 | Kwon et al. | |
| 8,286,047 | B2 * | 10/2012 | Che | H04L 1/1845 714/751 |
| 8,473,799 | B2 * | 6/2013 | Zhang | H04L 1/1822 370/315 |
| 9,065,651 | B2 * | 6/2015 | Smith | H04L 1/1812 |
| 9,143,282 | B2 * | 9/2015 | Meyer | H04B 7/022 |
| 9,306,709 | B2 * | 4/2016 | McBeath | H04W 72/042 |
| 9,614,650 | B2 * | 4/2017 | Novak | H04L 1/1893 |
| 2005/0226182 | A1 | 10/2005 | Itoh | |
| 2005/0249120 | A1 | 11/2005 | Heo et al. | |
| 2006/0104242 | A1 | 5/2006 | Kim et al. | |
| 2007/0189234 | A1 | 8/2007 | Heo et al. | |
| 2007/0189235 | A1 | 8/2007 | Chandra et al. | |
| 2009/0051595 | A1 | 2/2009 | Rao et al. | |
| 2009/0245190 | A1 | 10/2009 | Higuchi et al. | |
| 2010/0070816 | A1 | 3/2010 | Park et al. | |
| 2010/0218065 | A1 | 8/2010 | Balachandran et al. | |
| 2010/0281322 | A1 | 11/2010 | Park et al. | |

FOREIGN PATENT DOCUMENTS

| | | |
|---|---|---|
| EP | 2026491 | 2/2009 |
| WO | 2007124675 | 11/2007 |

OTHER PUBLICATIONS

3rd Generation Partnership Project; Technical Specification Group Radio Access Network; Evolved Universal.

Terrestrial Radio Access (E-Utra) Radio Resource Control (RRC); Protocol specification (Release 8), 3 GPP Standard; 3GPP TS 36.331, 3rd Generation Partnership Project (3GPP), Mobile Competence Centre; 650, Route DES Lucioles; F-06921 Sophia-Antipolis Cedex; France No. V8.6.0, Jun. 1, 2009 pp. 1-197, XP050377649, cited in the application chapter 5.3.10.6 Physical channel rec on figuration.

Research in Motion UK Limited: "DL Harq Operation during Transmission Mode change."; 3GPP Draft; R2-094287, 3Rd Generation Partnership Project (2GPP), Mobile Competence Centre ; 650, route DES Lucioles; F-06921 Sophia—Antipolis Cedex; France; no. Shenzhen, China; Aug. 16, 2009.

PCT Search Report dated Apr. 6, 2011, in corresponding PCT patent application No. PCT/US2010/044722.

Notice of Allowance issued in U.S. Appl. No. 14/933,789 dated Jan. 29, 2018, 7 pages.

3rd Generation Partnership Project; Technical Specification Group Radio Access Network; Evolved Universal Terrestrial Radio Access (E-Utra) Radio Resource Control (RRC); Protocol specification (Release 8), 3 GPP Standard; 3GPP TS 36.331, 3rd Generation Partnership Project (3GPP), Mobile Competence Centre; 650, Route DES Lucioles; F-06921 Sophia-Antipolis Cedes; France No. V8.6.0, Jun. 1, 2009 pp. 1-197, XP050377649, cited in the application chapter 5.3.10.6 Physical channel rec on figuration.

International Preliminary report on Patentability mailed Feb. 7, 2012, in corresponding PCT/US2010/044722.

Written Opinion of the International Searching Authority mailed Feb. 7, 2012, in corresponding PCT patent application No. PCT/US2010/04472.

* cited by examiner

METHOD AND SYSTEM FOR HANDLING HARQ OPERATIONS DURING TRANSMISSION MODE CHANGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *continuation reissue of U.S. application Ser. No. 14/933,789, filed Nov. 5, 2015, which is a reissue of U.S. Pat. No. 8,578,233, which is a* continuation of U.S. application Ser. No. 12/538,016 which was filed on Aug. 7, 2009 and which is entirely incorporated by reference herein.

FIELD OF THE DISCLOSURE

The present disclosure relates to HARQ operations and in particular to HARQ operations during transmission mode changes.

BACKGROUND

Long Term Evolution (LTE), or Evolved Universal Terrestrial Radio Access (E-UTRA) is a radio technology that is evolving to permit multiple simultaneous transport blocks under various transmission modes. Thus, an E-UTRAN Node B (eNB) can, in certain transmission modes, send multiple transport blocks within the same subframe or transmission opportunity to a user equipment (UE).

The transition from one transmission mode to another may result data loss or other issues on a UE. In particular, a Hybrid Automatic Repeat Request (HARQ) scheme at the receiver maintains a soft combining buffer for each HARQ process.

Furthermore, the E-UTRA radio resource control (RRC) does not provide for an exact activation time during reconfiguration procedures. If a new mode of downlink transmission is applied by an eNB earlier than the time when a user equipment (UE) completes reconfiguration, reception of data by the UE may fail. Similarly, if the old downlink transmission mode continues to be applied by the eNB after the time when the UE completes reconfiguration, reception of the data by the UE may also fail.

BRIEF DESCRIPTION OF THE DRAWINGS

The present disclosure will be better understood with reference to the drawings in which.

DETAILED DESCRIPTION

Figure 1:
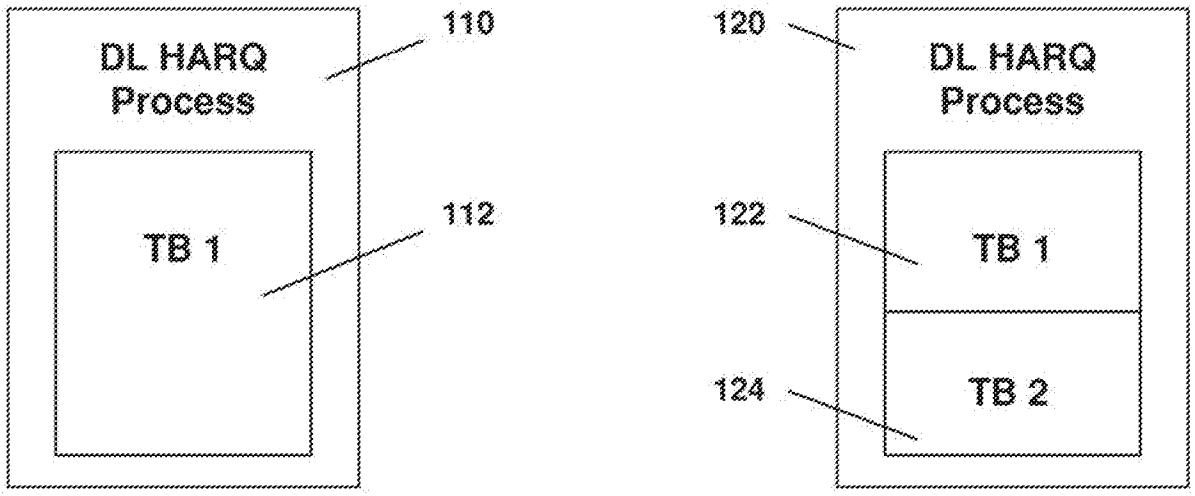
FIG. 1 is a block diagram showing downlink HARQ processes with one and two transport blocks.

The present disclosure is described below with regard to examples for downlink HARQ processes in Release 8 of E-UTRA (also known as Long Term Evolution (LTE)). This is, however, not meant to be limiting, and in some cases the methods and systems applied can be also utilized with uplink HARQ processes, for example in future E-UTRA releases. In particular, Long Term Evolution Advanced (LTE-A) may use Multiple Input Multiple Output (MIMO) for uplink transmissions and in this case the methods and systems of the present disclosure may be utilized for uplink as well as downlink processes.

Furthermore, the examples below are only meant to be illustrative of the varied methods and systems, and could be modified by those skilled in the art and still be within the scope of the present disclosure. In particular, the present disclosure could be applied to radio networks having more or less than seven transmission modes, to scenarios where more than two transport blocks are permitted in a single subframe, among other variations.

Downlink Transmission Modes

In E-UTRA (LTE) Release 8, seven downlink transmission modes have been defined in the 3$^{rd}$ Generation Partnership Project (3GPP) Technical Specification (TS) 36.213, "Technical Specification Group Radio Access Network; Evolved Universal Terrestrial Radio Access (E-UTRA); Physical Layer Procedures (Release 8)", version 8.7.0 2009-06, the contents of which are incorporated herein by reference.

Table 7.1-5 of this reference is shown below as Table 1.

TABLE 1

Downlink transmission modes for LTE

| Transmission mode | Transmission scheme of PDSCH |
|---|---|
| 1 | Single antenna port, port 0 |
| 2 | Transmit diversity |
| 3 | Transmit diversity if the associated rank indicator is 1;<br>Otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, single antenna port, port 0;<br>Transmit diversity;<br>Single antenna port; port 5 (beamforming) |

As seen from Table 1 above, seven transmission modes are defined. Transmission modes 1, 2, 5, 6 and 7 all utilize a single transport block per subframe (or downlink HARQ process) whereas transmission modes 3 and 4 may utilize 2 transport blocks.

The default transmission mode is transmission mode 1 or 2, depending on the number of physical broadcast channel (PBCH) antenna ports, as defined in Section 9.2.4 of the Technical Specification 36.331, "Third Generation Partnership Project; Technical Specification Group Radio Access Network; Evolved Universal Terrestrial Radio Access (E-UTRA); Radio Resource Control (RRC); Protocol Specification (Release 8)", version 8.6.0, 2009-06, the contents of which are incorporated herein by reference. The eNB may reconfigure the transmission mode for a particular UE in order to use a more efficient transmission mode or a more robust transmission mode. Examples of more efficient transmission modes may include closed-loop spatial multiplexing in a good radio environment. Examples of a robust transmission mode may include transmit diversity in unfavorable radio conditions.

A reconfiguration from one transmission mode to another is signaled through radio resource control protocols, using the AntennaInfo information element within the PhysicalConfigDedicated information element, as defined in Section 6.3.2 of the 3GPP TS 36.331 reference.

Under current E-UTRA specifications, when transmission modes 3 or 4 are configured, the eNB may transmit up to two transport blocks to a UE in a single subframe. In the remaining transmission modes, the eNB may transmit a maximum of one transport block to a UE in a given subframe. All of the UE-specific transport blocks for a given subframe are associated with the same downlink HARQ process.

Transmission Mode Reconfiguration

The transmission mode reconfiguration procedure is described as part of the physical channel reconfiguration procedure in Section 5.3.10.6 of the 3GPP TS 36.331 specification. Currently the technical standard reads:

5.3.10.6 Physical Channel Reconfiguration

The UE shall:

1> reconfigure the physical channel configuration in accordance with the received physicalConfigDedicated;

1> if the antennaInfo is included and set to 'explicitValue':

2> if the configured transmissionMode is not 'tm3' or 'tm4' release ri-ConfigIndex in cqi-ReportPeriodic, if previously configured;

1> else if the antennaInfo is included and set to 'defaultValue':

2> release ri-ConfigIndex in cqi-ReportPeriodic, if previously configured;

Furthermore, Section 11.2 of the 3GPP TS 36.331 specification requires that the UE complete a radio resource configuration, which may include a transmission mode reconfiguration, within 15 milliseconds, measured from the subframe at which the transport block containing the reconfiguration command was successfully received by the UE. The UE should be ready to transmit the RRC acknowledgement message that the radio resource reconfiguration has been completed no later than this 15 millisecond bound. However, in some cases additional time may be required for actual transmission and possible HARQ retransmission of the RRC acknowledgement message on the uplink.

Typically, the eNB would be able to determine with a reasonable level of confidence that the UE has received the transport block containing the RRC reconfiguration command from downlink HARQ acknowledgement or negative acknowledgement (ACK/NACK) feedback. However, there is a small probability of a NACK to ACK error on the uplink, where the eNB would initially think that the UE has received the RRC reconfiguration command when in fact the UE has not been able to successfully decode the corresponding transport block. Hence, the eNB cannot be completely sure that the UE has actually applied the transmission mode change until the eNB receives the RRC reconfiguration acknowledgement.

As will be appreciated, physical layer reconfigurations may be rather frequent. Furthermore, such transmission mode reconfigurations may occur in various situations, including but not limited to:

at initial RRC connection (or re-establishment), where the default transmission mode is first used and the UE needs to be moved to a MIMO mode;

following inter-cell handover when the channel conditions in the new cell are not yet fully known;

switching between line-of-sight and non-line-of-sight environments. This may occur, for example, in dense urban environments; and switching between different discontinuous reception (DRX) cycle lengths, thereby causing variations in the channel quality indicator (CQI) reporting rate and thus changes in the optimal MIMO mode.

Downlink HARQ Soft Buffers

For HARQ, each received coded bit is assigned a soft value. The soft values are typically represented with a fixed point number within an actual implementation. For example, a soft value using 5 bits of precision may be between negative fifteen and positive fifteen to define a bit that has been received. In this case, the sign may be used to indicate what the receiver hypothesizes that the bit is, where (for example) a negative sign may represent a bit value of zero and a positive sign may represent a bit value of one, and the magnitude is the level of confidence that the receiver has with regard to the value. Thus, a plus fifteen may show that the receiver is fairly sure that a bit value of "one" was received, whereas a negative fifteen may indicate that the receiver is fairly sure that a bit value of "zero" was received. Conversely, a fixed point number of "+1" may indicate that the receiver thinks that a bit value of 1 was received, but is not very sure. These soft bit values are then used as the input to FEC (Forward Error Correction) decoding (e.g. a turbo decoder), although any just-received soft bit values may first be combined with other previously stored/buffered soft bit values prior to FEC decoding.

For soft combining purposes, each of the available downlink HARQ processes maintains a soft combining buffer. The size of the buffer is defined in terms of the number of soft channel bits, where each soft bit represents a numerical value such as a Log Likelihood Ratio (LLR) used for Forward Error Correction (FEC) decoding purposes. As would be appreciated by those in the art, each soft bit value may actually require several bits of physical memory storage.

In LTE, a total number of soft channel bits for all downlink HARQ processes is defined in terms of the UE category. This is shown below with regard to Table 2, which is a representation of Table 4.1-1 of 3GPP TS 36.306, version 8.4.0, 2009-06, the contents of which are incorporated herein by reference.

As indicated in Table 2 below, each UE category has a maximum number of downlink shared channel (DL-SCH) transport block bits received within a TTI (Transmission Time Interval). As used in the present disclosure (i.e. referring to DL-SCH transport blocks carried on the PDSCH (Physical Downlink Shared CHannel) and/or to UL-SCH (Uplink Shared CHannel) transport blocks carried on the PUSCH (Physical Uplink Shared CHannel)), one TTI can be considered to be equivalent to one subframe, and may also be referred to as one transmission opportunity. In the context of E-UTRA, therefore, one transmission opportunity refers to a transmission unit of time equal to one subframe, which may have a length of 1 ms.

The fourth column of Table 2 indicates the total soft buffer size across all HARQ processes. For example, with frequency division duplexing (FDD), eight HARQ processes may be defined. Thus the total number of soft channel bits is the total for all of the HARQ processes.

TABLE 2

| Downlink physical layer parameter values set by the field ue-Category | | | | |
|---|---|---|---|---|
| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
| 1 | 10296 | 10296 | 250368 | 1 |
| 2 | 51024 | 51024 | 1237248 | 2 |
| 3 | 102048 | 75376 | 1237248 | 2 |
| 4 | 150752 | 75376 | 1827072 | 2 |
| 5 | 299552 | 149776 | 3667200 | 4 |

The following equation, taken from Section 5.1.4.1.2 of 3GPP TS 36.212, version 8.7.0, 2009-06, the contents of which are incorporated herein by reference, gives the soft buffer size for a transport block as:

$$N_{IR} = \left\lfloor \frac{N_{soft}}{K_{MIMO} \cdot \min(M_{DL_HARQ}, M_{limit})} \right\rfloor \quad \text{(Equation 1)}$$

where $N_{IR}$ is the number of incremental redundancy bits (i.e. the soft buffer size for one individual transport block);

$N_{soft}$ is the total number of soft channel bits as provided in Table 2 above;

$K_{MIMO}$ is equal to 2 if the UE is configured to receive physical downlink shared channel (PDSCH) transmissions based on transmission modes 3 or 4, or equal to 1 otherwise;

$M_{DL_HARQ}$ is the maximum number of downlink HARQ processes which is fixed as 8 for frequency division duplexing but may be variable for time division duplexing;

$M_{limit}$ is a constant and is equal to 8.

Equation 1 provides that the available soft bit memory is divided equally among the transport blocks that may be contained with a downlink HARQ process. In other words, the memory is divided equally among the downlink HARQ processes. Furthermore, when a transmission mode potentially utilizes two transport blocks per subframe such as in transmission modes 3 or 4, the amount of soft bit memory per transport block is half of what it would be for the other transmission modes. That is, the total memory allocated per downlink HARQ process is either occupied by one transport block for transmission modes 1, 2, 5, 6 or 7, or divided equally between two transport blocks for transmission modes 3 and 4, regardless of the actual sizes of the individual transport blocks that may be stored in these buffers.

Referring to FIG. 1, FIG. 1 shows the buffer for a downlink HARQ process having a single transport block and also the buffer for a downlink HARQ process having two transport blocks. The total memory size for each of these two downlink HARQ processes is the same.

In particular, the downlink HARQ process in transmission mode 1, 2, 5, 6 or 7 is shown as DL (downlink) HARQ process 110, whereas a downlink HARQ process having two transport blocks is shown as DL HARQ process 120. In the first case, DL HARQ process 110 may receive a maximum of one transport block 112 whereas DL HARQ process 120 may receive a maximum of two transport blocks, namely transport block 122 and transport block 124. As will be appreciated by those skilled in the art, there may be various numbers of these HARQ processes such as 8 HARQ processes in FDD. In this case, buffers for each of these 8 DL HARQ processes would be provided although a single total area of memory would generally be used in an actual implementation and divided into 8 or 16 memory portions.

HARQ Buffer Flush

Current technical specifications do not describe HARQ process reconfiguration on transmission mode changes. Various concerns on transmission mode changes include, but are not limited to, the partitioning or consolidating of buffers when the number of transport blocks per downlink HARQ process changes as a result of a transmission mode change. Also, the activation time of the new transmission mode is not clearly provided for under the current specifications.

A first embodiment of the present disclosure provides for the flushing of all downlink HARQ buffers at the UE whenever the transmission mode is changed. Any further transmissions or retransmissions to a downlink HARQ process following the transmission mode change would then be considered to be the very first transmission to the downlink HARQ process. In other words, the new data indicator (NDI) flag for the first transport block received after the transmission mode change for each individual transport block buffer instantiation would be considered to have been toggled even if the received transport block corresponds to an HARQ retransmission.

A specification change to 3GPP TS 36.331, and in particular to Section 5.3.10.6 may be made to reflect the flushing of the buffers, and an example of such a change may be (new text is shown in boldface):

5.3.10.6 Physical Channel Reconfiguration

The UE shall:

1> reconfigure the physical channel configuration in accordance with the received physicalConfigDedicated;

1> if the antennaInfo is included and set to 'explicit Value':

2> if the configured transmissionMode is not 'tm3' or 'tm4' release ri-ConfigIndex in cqi-ReportPeriodic, if previously configured;

1> else if the antennaInfo is included and set to 'defaultValue':

2> release ri-ConfigIndex in cqi-ReportPeriodic, if previously configured;

1> if the transmission mode changes as a result of applying the received physicalConfigDedicated:

2> instruct the MAC to flush all DL HARQ buffers and consider the next transmission of a transport block for each DL HARQ process as the very first transmission for that DL HARQ process;

As will be seen when comparing the example above with the current 5.3.10.6 physical channel reconfiguration specifications, a new condition is added. Specifically, if the transmission mode changes as a result of applying the received PhysicalConfigDedicated, then the MAC (Medium Access Control) is instructed to flush all downlink HARQ buffers and consider the next transmission of a transport block for each downlink HARQ process as the very first transmission for that downlink HARQ process.

Figure 2:
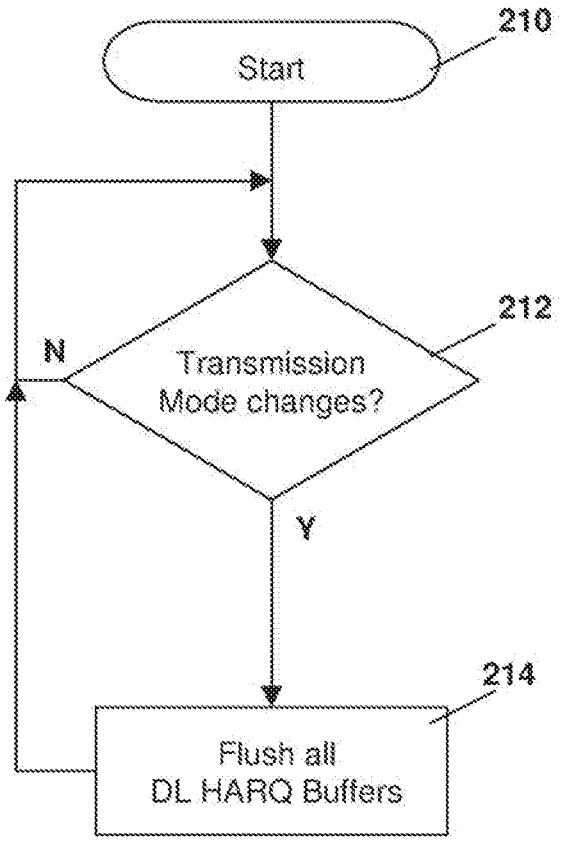
FIG. 2 is a flowchart showing a procedure for flushing HARQ soft buffers on a transmission mode change.

Reference is now made to FIG. 2. In FIG. 2, the procedure starts at block 210 and proceeds to block 212 in which a check is made to determine whether the transmission mode has changed. As will be appreciated, the transmission mode change is as a result of receiving a PhysicalConfigDedicated message from the eNB.

From block 212, if the transmission mode has not changed, the procedure proceeds back to block 212 and continues to wait until a transmission mode change occurs.

From block 212, once the transmission mode change has occurred, the procedure proceeds to block 214 in which all downlink HARQ buffers are flushed. The procedure then proceeds back to block 212 and continues to wait for further transmission mode changes.

HARQ Buffer Flush Only when Number of Transport Blocks Changes

In an alternative embodiment, the flushing of the downlink HARQ buffers at the UE need only occur when the transmission mode changes such that the maximum number of transport blocks per downlink HARQ process changes as a result of the transmission mode reconfiguration. As will be appreciated by those in the art, this occurs in the following two situations in current LTE Release 8 specifications:

1. the transmission mode changes from one of transmission modes 1, 2, 5, 6 or 7 to one of transmission modes 3 or 4. In this case, the number of transport blocks per downlink HARQ process changes from one transport block to two transport blocks; and
2. the transmission mode changes from one of transmission modes 3 or 4 to one of transmission modes 1, 2, 5, 6 or 7. In this case, the number of transport blocks per downlink HARQ process changes from two to one.

In the alternative embodiment, the UE needs to know its old transmission mode and its new transmission mode in order to check whether the transition is one of the two enumerated transmission mode changes above. The UE would already have this required information available.

If a transmission mode change occurs in which the number of transport blocks per downlink HARQ process changes (from one to two or from two to one), the downlink HARQ buffers are flushed and the initial delivery of any further transport blocks to a downlink HARQ process would be considered as the very first transmission for that downlink HARQ process.

For transmission mode changes where the number of transport blocks per downlink HARQ process remains the same, there is no need to flush the downlink HARQ buffers since the HARQ retransmissions could continue in a transparent manner to the UE following the transmission mode reconfiguration.

The incremental complexity over the solution where buffers are flushed at each transmission mode change is only minor for the alternative embodiment and a less visible impact on downlink data throughput may be present since potentially useful data for HARQ combining would only be discarded for a subset of the total possible transmission mode reconfiguration scenarios.

The specification for 3GPP TS 36.3.3.1, Section 5.3.10.6 may be changed, for example, as follows (new text is shown in boldface):

5.3.10.6 Physical Channel Reconfiguration

The UE shall:

1> reconfigure the physical channel configuration in accordance with the received physicalConfigDedicated;

1> if the antennaInfo is included and set to 'explicit Value':

2> if the configured transmissionMode is not 'tm3' or 'tm4' release ri-ConfigIndex in cqi-ReportPeriodic, if previously configured;

1> else if the antennaInfo is included and set to 'defaultValue':

2> release ri-ConfigIndex in cqi-ReportPeriodic, if previously configured;

1> if the transmission mode changes from one of {'tm1', 'tm2', 'tm5', 'tm6', 'tm7'} to one of {'tm3', 'tm4'} or from one of {'tm3', 'tm4'} to one of {'tm1', 'tm2', 'tm5', 'tm6', 'tm7'} as a result of applying the received physicalConfigDedicated:

2> instruct the MAC to flush all DL HARQ buffers and consider the next transmission of a transport block for each DL HARQ process as the very first transmission for that DL HARQ process;

As can be seen from the above, the specification is amended to indicate if the transmission mode changes from one of transmission modes 1, 2, 5, 6 or 7 to one of 3 or 4, or if the transmission mode changes from one of 3 or 4 to one of transmission modes 1, 2, 5, 6 or 7, then as a result the MAC is instructed to flush all downlink HARQ buffers and consider the next transmission of a transport block for each downlink HARQ process as the very first transmission for that downlink HARQ process.

Figure 3:
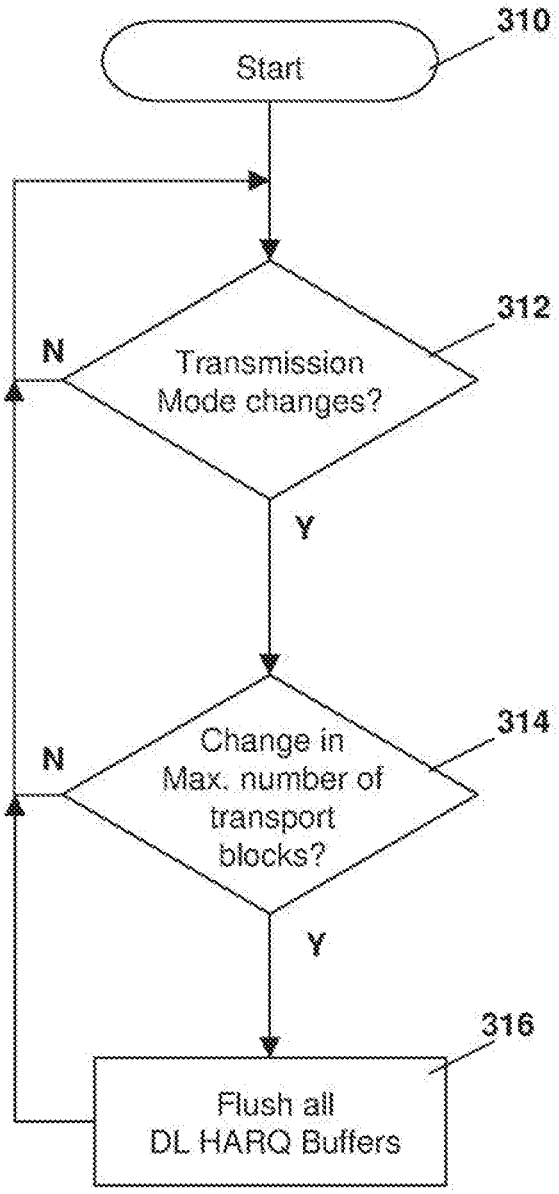
FIG. 3 is a flowchart showing a procedure for flushing HARQ soft buffers if a transmission mode change occurs in which the maximum number of transport blocks changes.

Reference is now made to FIG. 3. The procedure of FIG. 3 starts at block 310 and proceeds to block 312 in which a check is made to determine whether a transmission mode change has occurred. If not, the procedure proceeds back to block 312 and continues to wait for a transmission mode change to occur.

From block 312, if a transmission mode change is detected the procedure proceeds to block 314 in which a check is made to determine whether the maximum number of transport blocks per downlink HARQ process changes as a result of the transmission mode change. In other words, the check at block 314 checks whether the transmission mode change was from one of transmission modes 1, 2, 5, 6 or 7 to one of transmission modes 3 or 4, or whether the transmission mode change was from one of transmission modes 3 or 4 to one of transmission modes 1, 2, 5, 6 or 7. If not, the procedure proceeds back to block 312, where the procedure continues to wait for a transmission mode change.

Conversely, from block 314, if a change is detected where the maximum number of transport blocks changes, the procedure proceeds to block 316 in which all downlink HARQ buffers are flushed. The procedure then proceeds back to block 312 in which the procedure continues to wait for a further transmission mode change.

As will be appreciated by those skilled in the art, the checks at block 312 and 314 could be combined into a single check in some implementations. As will also be appreciated by those skilled in the art, an extension of FIG. 3 can be applied in situations where more than two transport blocks can be transmitted in one subframe (e.g. in LTE-A).

In a further alternative embodiment, the downlink HARQ buffers for the UE may be flushed only when the maximum number of transport blocks per downlink HARQ process changes from one transport block per process to two. In other words, if the transmission mode changes from one of transmission mode 1, 2, 5, 6 or 7 to one of transmission mode 3 or 4, the downlink HARQ buffers are flushed. In the opposite direction, when the transmission mode reconfiguration switches from two transport blocks per downlink HARQ process to one, the soft buffers of the UE would not be flushed, but only the first of the two transport blocks would be retained. The buffered soft bit values belonging to the second transport block would be discarded.

Figure 4:
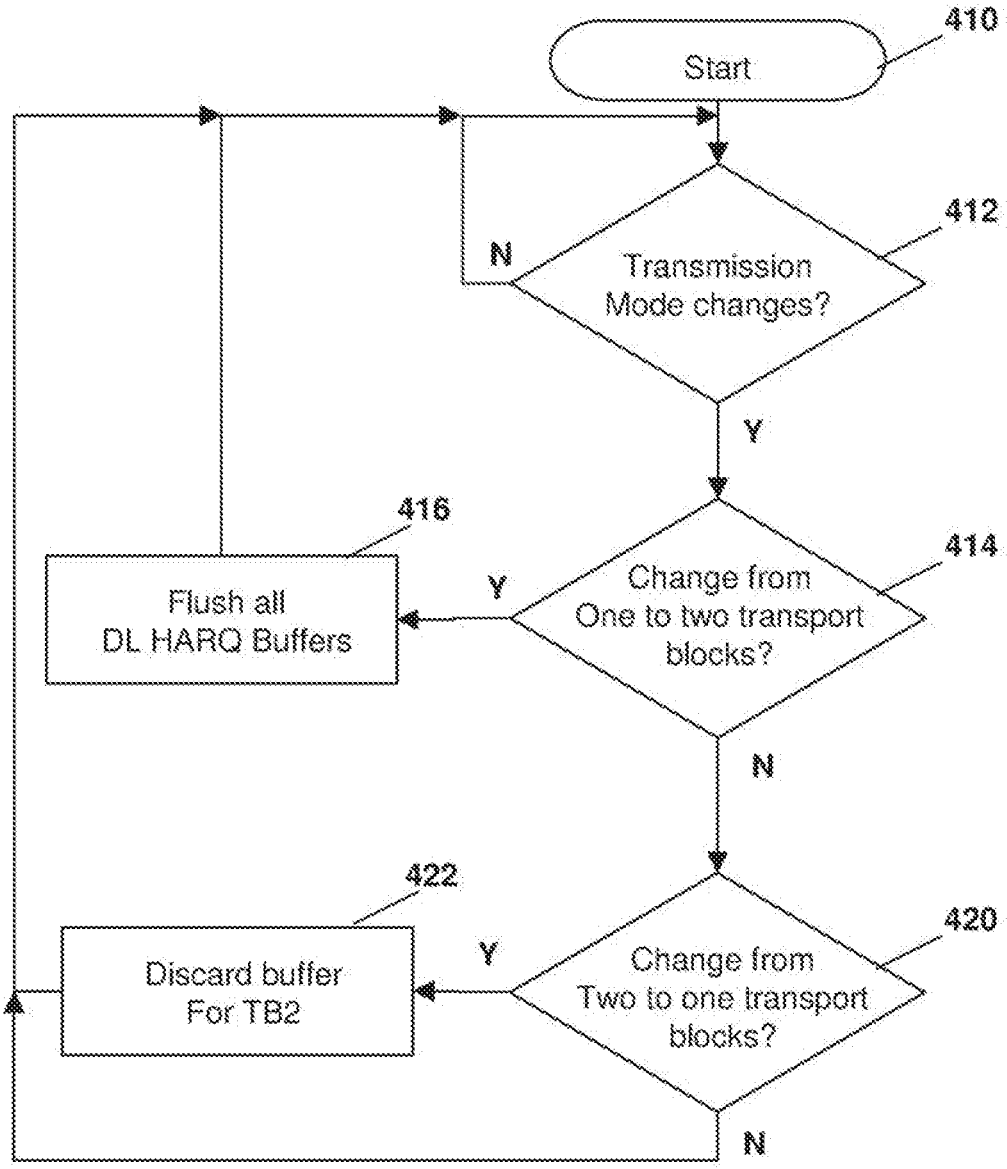
FIG. 4 is a flowchart showing a procedure for flushing buffers on transmission mode change with retention of soft bits when transitioning from a mode with two transport blocks to a mode with one transport block.

Reference is now made to FIG. 4. The procedure of FIG. 4 starts at block 410 and proceeds to block 412 in which a check is made to determine whether a transmission mode change has occurred. If not, the procedure proceeds to loop back to block 412 in which the procedure continues to wait for a transmission mode change.

From block 412, once a transmission mode change has been detected the procedure proceeds to block 414 in which a check is made to determine whether the transmission mode change is from one of transmission modes 1, 2, 5, 6 or 7 to one of transmission modes 3 or 4, or in other words from a transmission mode having a maximum of one transport block per downlink HARQ process to a transmission mode with a maximum of two transmission blocks. If yes, the procedure proceeds to block 416 in which all downlink HARQ buffers are flushed. The procedure then proceeds back to block 412 to wait for a further transmission mode change.

From block 414, if the change was not from a transmission mode having one transport block per downlink HARQ process to a transmission mode having two transmission blocks, the procedure proceeds to block 420 in which a check is made to determine whether the transmission mode change was from one of transmission modes 3 or 4 to one of transmission modes 1, 2, 5, 6 or 7. Thus, the check of block 420 determines whether the transmission mode change is from a transmission mode having two transport blocks per downlink HARQ process to a transmission mode having one transmission block. If yes, the procedure proceeds to block 422 in which the buffer for the second transport block of each downlink HARQ process is discarded. The procedure then proceeds back to block 412 in which a change in transmission mode is checked for.

From block 420, if the change was not from one of transmission modes 3 or 4 to one of transmission modes 1, 2, 5, 6 or 7, then the procedure proceeds back to block 412. As will be appreciated, since the transmission mode change was not from one in which there is a single transport block to one where there are two transport blocks, nor was the change from a transmission mode in which there are two transport blocks to one in which there is only one transport block, the number of transport blocks remains the same between the two transmission modes and therefore no buffer flush is required.

As will be appreciated by those in the art, the checks of blocks 414 and 420 could also be performed independently of each other and in separate procedures. Furthermore, in some embodiments the check of either block 414 or block 420 may be unnecessary.

Figure 4A:
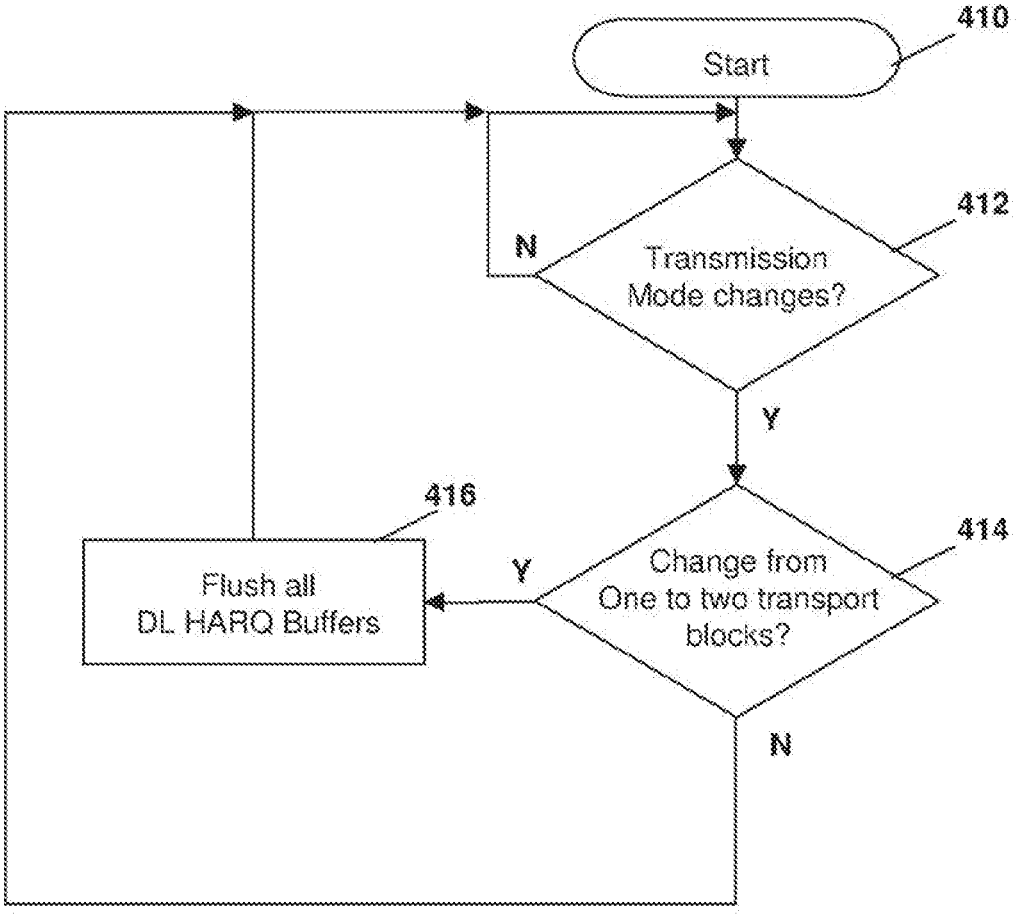
FIG. 4A is a flowchart showing a procedure for flushing buffers on a change from a mode with one transport block to a mode with two transport blocks.

Reference is made to FIG. 4A. In FIG. 4A, the procedure of FIG. 4 has been modified by removing the check at block 420. In particular, the procedure of FIG. 4A starts at block 410 and proceeds to block 412 in which a check is made to determine whether a transmission mode change has occurred. If no, the procedure continues to check for a transmission mode change at block 412.

If a transmission mode change is detected at block 412 the procedure proceeds to block 414 in which a check is made to determine whether the transmission mode change was from a transmission mode having one transport block to a transmission mode having two transport blocks. If yes, the procedure proceeds to block 416 and flushes all of the downlink HARQ buffers. If, in block 414 the check is negative, the procedure proceeds back to block 412. Further from block 416 the procedure proceeds back to block 412.

Figure 4B:
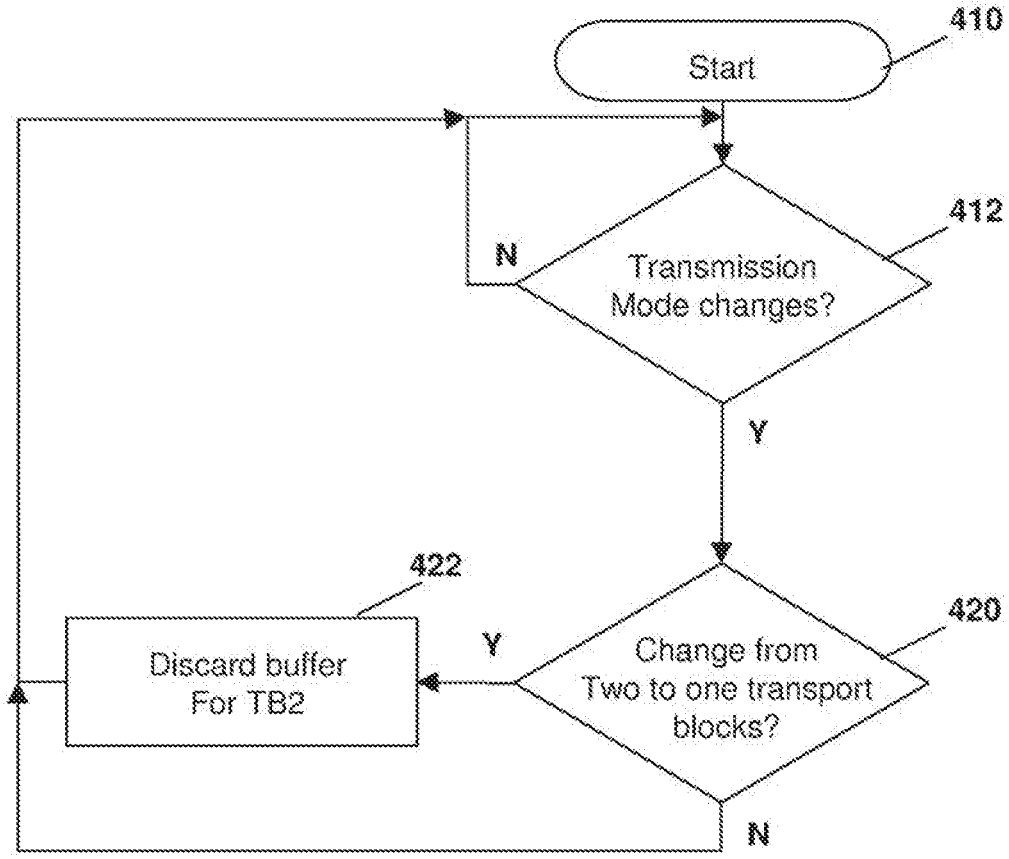
FIG. 4B is a flowchart showing a procedure for discarding soft buffer bits on a transition from a mode with two transport blocks to a mode with one transport block.

Reference is now made to FIG. 4B. The procedure of FIG. 4B is similar to that of FIG. 4 with the exception that the check of block 414 has been removed. In particular, the procedure of FIG. 4B starts at block 410 and proceeds to block 412 in which a check is made to determine whether a transmission mode change has occurred. If no, the procedure continues to check for a transmission mode change at block 412.

Once a transmission mode change is detected at block 412 the procedure proceeds to block 420 in which a check is made to determine whether the change was from a transmission mode having two transport blocks to a transmission mode having one transport block. If yes, the procedure proceeds to block 422 in which the buffer for the second transport block is discarded. From block 422 the procedure proceeds to block 412 to check for further transmission mode changes.

From block 420, if the change is not from a transmission mode having two transport blocks to a transmission mode having one transport block, the procedure proceeds to block 412 to continue checking for further transmission mode changes.

In an additional alternative embodiment, if the first of the two transport blocks had been successfully decoded in the most recent decoding attempt on that transport block and there were thus no buffered soft bit values for the first transport block that had not been successfully decoded, then the soft bit values belonging to the first transport block could be discarded and the soft bit values (and other relevant parameters) belonging to the second transport block (assuming that the second transport block had not been successfully decoded in the most recent decoding attempt on that transport block) could be handled as the "first" transport block (which would be retained).

Figure 5:
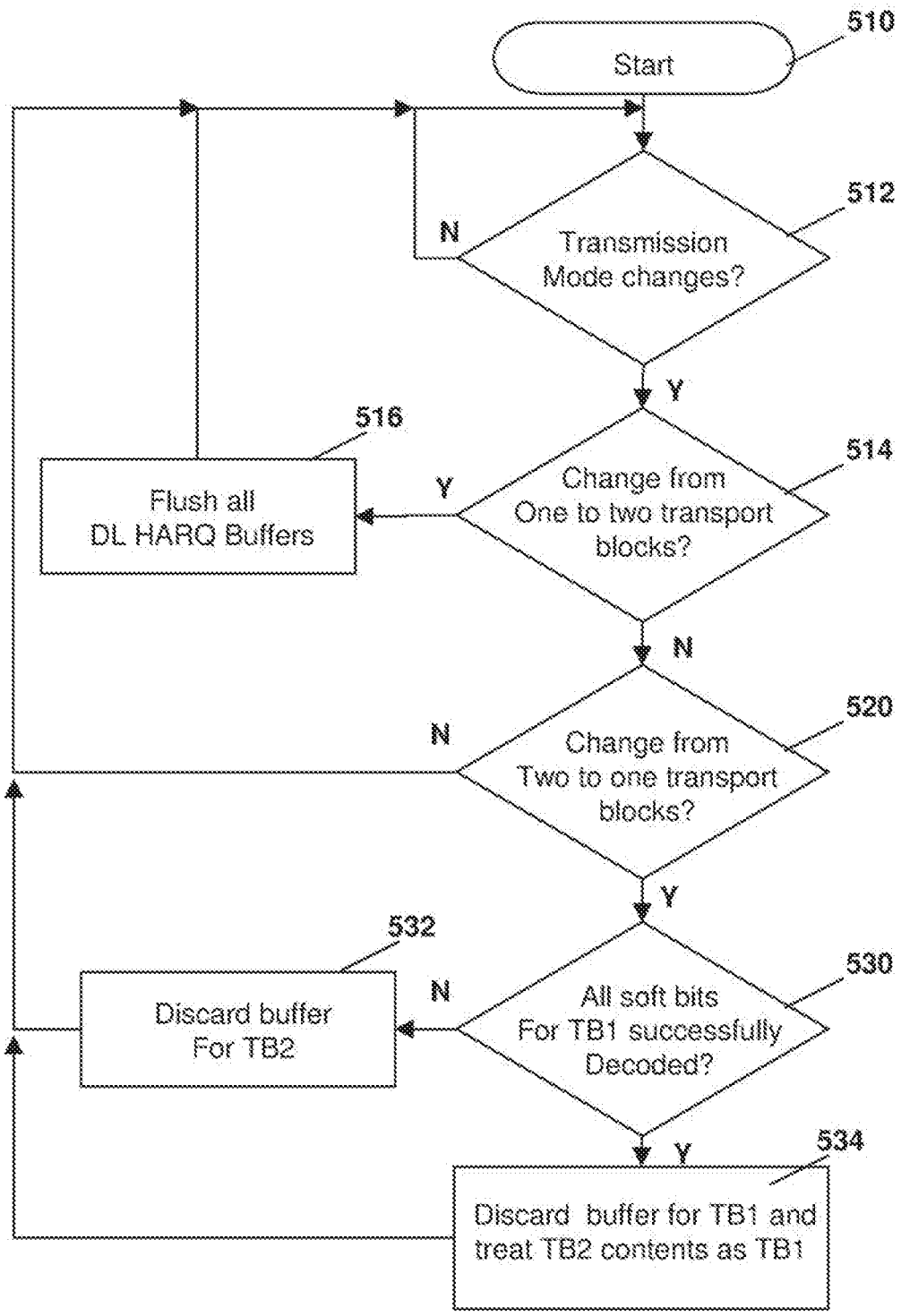
FIG. 5 is a flowchart showing a procedure for flushing buffers on transmission mode change with retention of a second transport block's soft bits when transitioning from a mode with two transport blocks to a mode with one transport block.

Reference is now made to FIG. 5. In the further alternative embodiment the procedure starts at block 510 and proceeds to block 512 in which a check is made to determine whether a transmission mode has changed. If no, the procedure proceeds to loop back to block 512 and wait until a transmission mode change has occurred.

From block 512, once a transmission mode change has occurred, the procedure proceeds to block 514 to determine whether the change was from a transmission mode having a maximum of one transport block to a transmission mode having a maximum of two transport blocks. If yes, the procedure proceeds to block 516 in which all downlink HARQ buffers are flushed. From block 516 the procedure proceeds back to block 512 and waits for further transmission mode change.

If, in block 514, it is determined that the change was not from a transmission mode with one transport block to a transmission mode with two transport blocks, the procedure proceeds to block 520. In block 520 a check is made to determine whether the change was from a transmission mode having two transport blocks to a transmission mode having one transport block. If no, the procedure proceeds back to block 512 and continues to wait for a further transmission mode change.

From block 520, if it is determined that the change was from a transmission mode having two transport blocks to a transmission mode having one transport block the procedure proceeds to block 530 in which a check is made to determine whether all of the soft bits for the first transport block have been successfully decoded. If no, the process proceeds to block 532 in which the buffer for the second transport block is discarded. The procedure then proceeds from block 532 to block 512 in which a further transmission mode change is awaited.

From block 530, if all of the soft bits for the first transport block are successfully decoded, the procedure proceeds to block 534 in which the contents of the first transport block are discarded and the second transport block contents are retained.

As will be appreciated by those skilled in the art, the checks at blocks 514 and 520 could be performed in independent procedures and in some cases one of the checks could be excluded completely. If the procedure of FIG. 5 excludes the check of block 520 then the procedure would be modified to the procedure of FIG. 4A above.

Figure 5A:
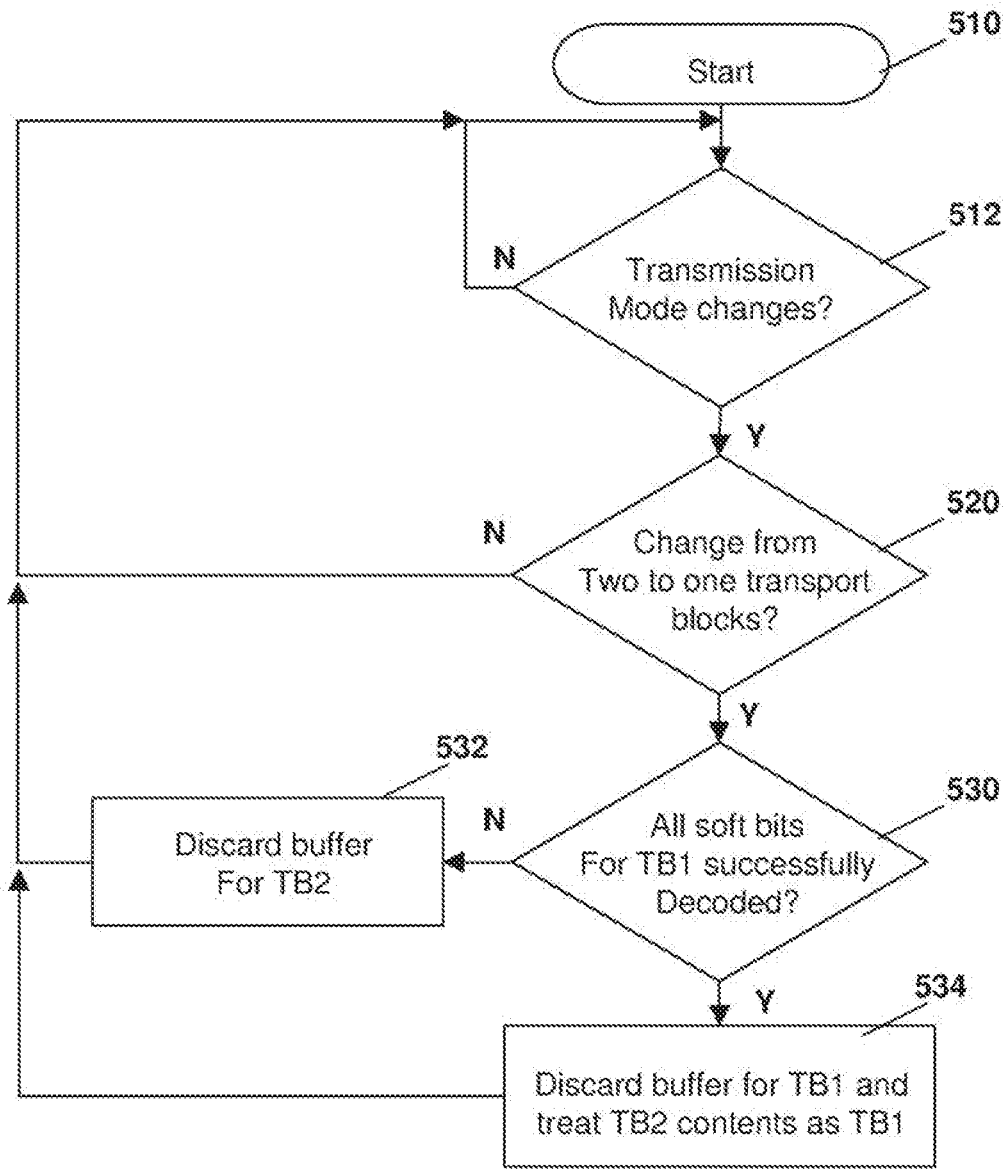
FIG. 5A is a flowchart showing a procedure for retention of a second transport block's soft bits when transitioning from a mode with two transport blocks to a mode with one transport block.

Reference is now made to FIG. 5A. FIG. 5A shows the procedure of FIG. 5 in which the check of block 514 has been removed. In particular, the procedure of FIG. 5A starts at block 510 and proceeds to block 512 in which a check is made to determine whether a transmission mode change has occurred. If no, the procedure continues to check for a transmission mode change at block 512.

Once a transmission mode change has been detected at block 512 the procedure proceeds to block 520 in which a check is made to determine whether the change is from a transmission mode having two transport blocks to a transmission block having one transport block. If no, the procedure proceeds to block 512 to check for further transmission mode changes.

From block 520, if the change in transmission modes is from a transmission mode having two transport blocks to a transmission mode having one transport block the procedure proceeds to block 530 in which a check is made to determine whether all soft bits for the first transport block have been successfully decoded. If the check of block 530 determines that all soft bits for the first transport block have been successfully decoded, the procedure proceeds to block 534 in which the buffer for the first transport block is discarded and the contents of the second transport block are treated as the first transport block.

From block 530 if the check determines that not all soft bits for a first transport block have been successfully decoded, the procedure proceeds to block 532 in which the buffer for the second transport block is discarded.

From blocks 532 and 534 the procedure proceeds to block 512 to continue checking for further transmission mode changes.

As will be appreciated by those in the art, in situations where there are more than two transport blocks possible, the procedures of FIGS. 4, 4A, 4B, 5 and 5A could be modified to discard the buffers of the second and subsequent transport blocks and keep the first transport block, or if the soft bits in the first transport block have all been successfully decoded, the soft bits of a second or subsequent transport block could be transferred to the first transport block, and the subsequent transport block bits could be discarded. Additionally, the procedures of FIGS. 4, 4A, 4B, 5 and 5A could be modified to handle the more general situation of a transmission mode change from M transport blocks per HARQ process to N transport blocks per HARQ process (or vice versa), where M>1, N>1, and M>N. In this situation, M-N transport blocks would be discarded, and N transport blocks would be retained.

Downlink HARQ Buffer Repartitioning

In a further embodiment, instead of flushing a buffer, repartitioning could occur to maintain the content or partial content of a buffer. In particular, when a transmission mode change occurs that results in a change in the number of transport blocks per downlink HARQ process, the UE could still maintain the existing contents of its soft combining buffers to allow for potential downlink HARQ retransmissions following the change of the transmission mode.

Figure 6:
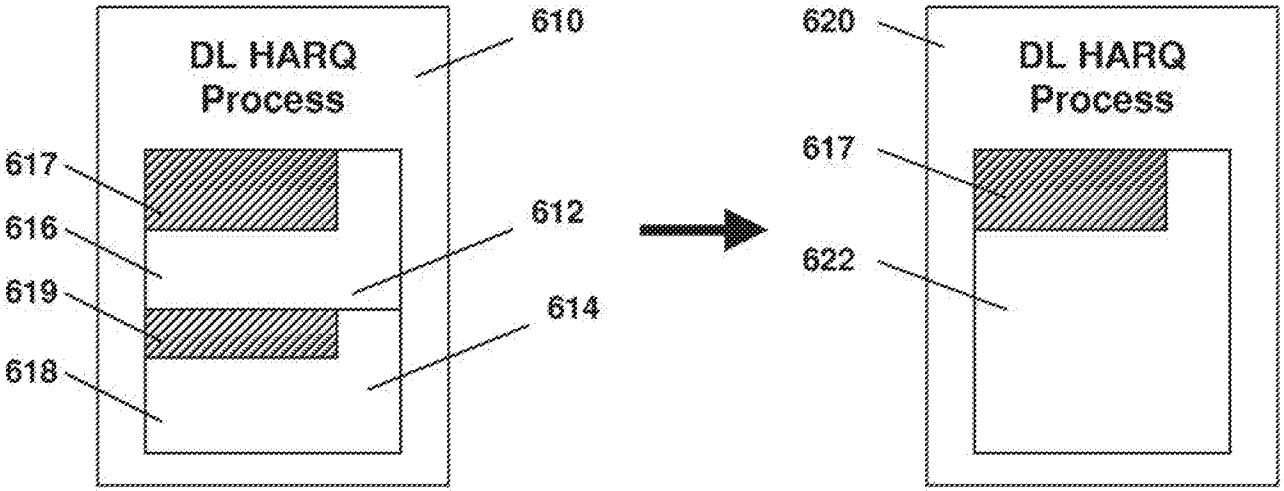
FIG. 6 is a block diagram showing the retention of used soft bits on transition from a mode with two transport blocks to a mode with one transport block.

In particular, reference is now made to FIG. 6. FIG. 6 shows a downlink HARQ process 610 and a downlink HARQ process 620. The transition from a first transmission mode with two transport blocks, as illustrated by downlink HARQ process 610, to a downlink HARQ process 620 having only one transmission block could occur similar to the transition as described above with regard to FIG. 4. In particular, as seen in downlink HARQ process 610, two buffers, one for each transport block exist. These are labeled as buffer 612 and buffer 614.

Furthermore, buffer 612 includes an allocated portion 616 and a used portion 617 whereas buffer 614 includes an allocated portion 618 and a used portion 619. In the example of FIG. 6, the used portion takes up only a portion of the allocated portion of the downlink HARQ process for each buffer for each transport block. The size of the allocated portion may be fixed (for example, according to Equation 1) but the size of the used portion depends on the actual size of the coded transport block (including both systematic (information) and parity bits), which may vary from one transport block to another.

During a transmission mode transition as shown in FIG. 6, any buffered soft bits associated with the second transport block would be discarded, and any buffered soft bits associated with the first transport block would be retained. The stored NDI flag associated with the first transport block would also be retained in order to determine whether any future transport block transmissions that are received for this downlink (DL) HARQ process are new transmissions (NDI flag is toggled) or retransmissions of the currently buffered transport block (NDI flag is not toggled). The used portion 617 of the first transport block buffer 612 is thus retained as part of the newly expanded allocated buffer 622 of DL HARQ process 620.

FIG. 6 could further be extended to situations with more than two transport blocks. In this case, the used portion 617 of the first transport block buffer 612 could be retained and the soft bits associated with the second transport block and subsequent transport blocks could be discarded. In addition, where the transmission mode change is from a mode with multiple (M) transport blocks to another mode with multiple (N) transport blocks, where M>N, then the used portions of the first N transport blocks would be retained, while the subsequent M−N transport blocks would be discarded.

Figure 7:
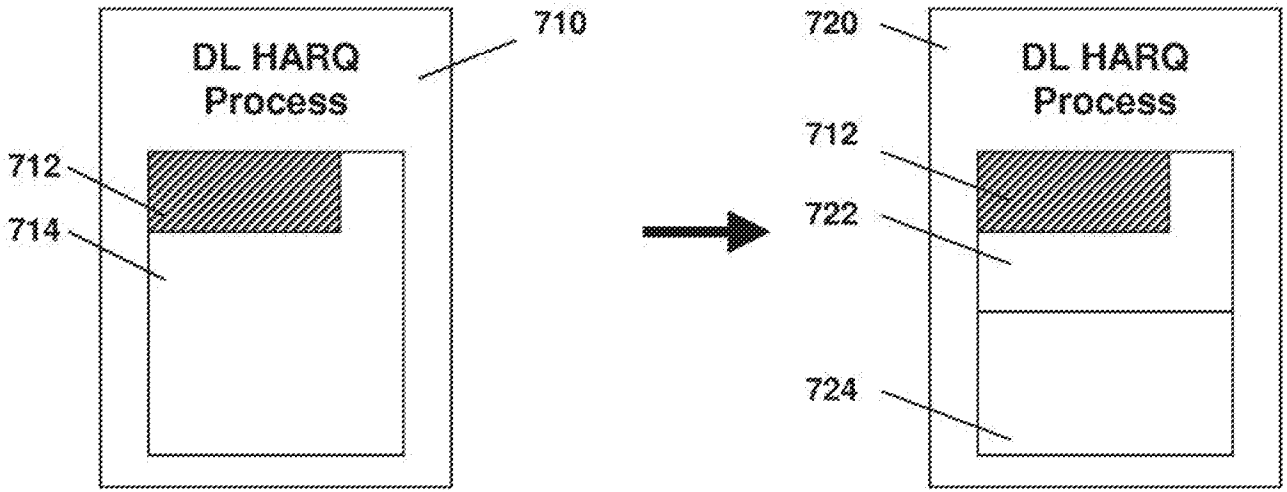
FIG. 7 is a block diagram showing the retention of used soft bits on transition from a mode with one transport block to a mode with two transport blocks.

Reference is now made to FIG. 7. FIG. 7 shows a transition of a downlink HARQ process 710 having a transmission mode with one transport block buffer to downlink HARQ process 720 having a transmission mode with two buffers 722 and 724.

Downlink HARQ process 710 includes a single buffer with an allocated portion 714 and a used portion 712.

On transition, the allocated area 714 is reduced for the downlink HARQ process 720 with two transport blocks. Any buffered soft bits associated with the first transport block, namely used portion 712, are retained, and any values corresponding to the second transport block are initialized. In the case of more than two transport blocks, subsequent transport blocks would also be initialized. This includes the stored NDI flag for the second or subsequent transport blocks. Essentially, when a second transport block is first received following a transmission mode change, it would be considered to be the very first transmission for that half of the downlink HARQ process (i.e. the NDI flag would be considered to have been toggled). Conversely, a future reception of a transmission corresponding to the first transport block would be determined to be a new transmission or a retransmission depending (respectively) upon whether the received NDI flag was toggled or not as compared to the stored NDI flag value.

A change in the 3GPP TS 36.331 specification to reflect the retention of data on transition may be as follows (new text is shown in boldface):

5.3.10.6 Physical Channel Reconfiguration

The UE shall:

1> reconfigure the physical channel configuration in accordance with the received physicalConfigDedicated;

1> if the antennaInfo is included and set to 'explicit Value':

2> if the configured transmissionMode is not 'tm3' or 'tm4' release ri-ConfigIndex in cqi-ReportPeriodic, if previously configured;

1> else if the antennaInfo is included and set to 'defaultValue':

2> release ri-ConfigIndex in cqi-ReportPeriodic, if previously configured;

1> if the transmission mode changes from one of {'tm1', 'tm7'} to one of {'tm3', 'tm4'} as a result of applying the received physicalConfigDedicated:

2> instruct the MAC to consider the next transmission of a second transport block for each DL HARQ process as the very first transmission for that transport block of DL HARQ process;

1> if the transmission mode changes from one of {'tm3', 'tm4'} to one of {'tm1', 'tm2', 'tm5', 'tm6', 'tm7'} as a result of applying the received physicalConfigDedicated:

2> instruct the MAC to discard any buffered soft bits and corresponding parameters (e.g. NDI flag, transport block size) associated with the second transport block of each DL HARQ process;

As can be seen from the above, transitioning from a transmission mode with one transport block per downlink HARQ process to a transmission mode with two transport blocks results in the MAC considering the next transmission of the second transport block to be an initial transmission. Also, transitioning from a transmission mode with two transport blocks to a transmission mode with one transport block results in the MAC discarding buffered soft bits for the second transport block.

Figure 8:
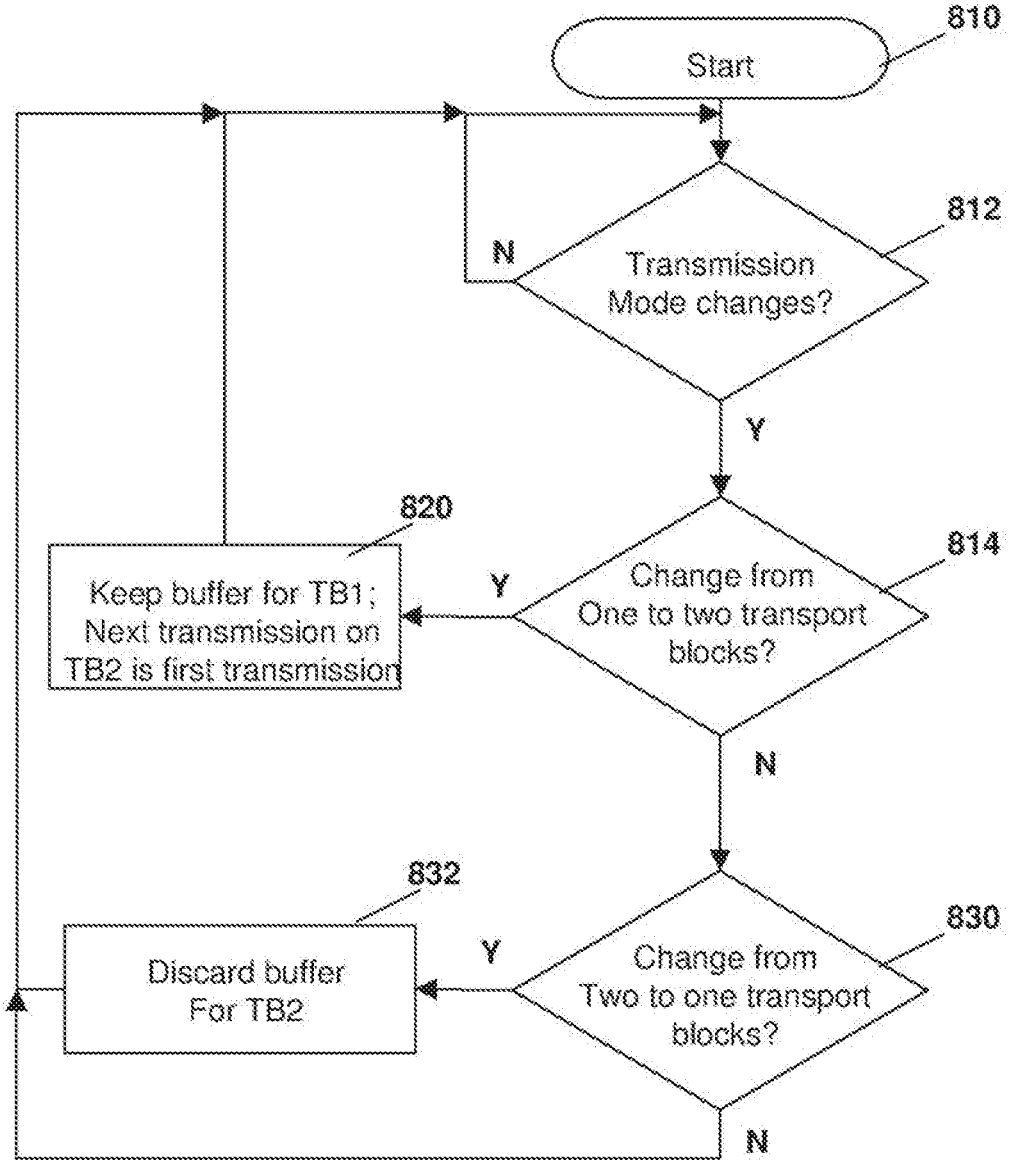
FIG. 8 is a flowchart showing the retention of used soft bits on transition between transmission modes with different numbers of transport blocks.

Reference is now made to FIG. 8. FIG. 8 shows the procedure as redefined in the 3GPP TS 36.331 modifications above. In particular the procedure starts at block 810 and proceeds to block 812 in which a check is made to determine whether a transmission mode change has occurred. If not, the procedure proceeds back to block 812 and continues to check for a transmission mode change.

Conversely, if a transmission mode change is detected in block 812, the procedure proceeds to block 814 in which a check is made to determine whether the transmission mode changes from a mode in which there is one transport block per downlink HARQ process to a mode in which there are two transport blocks. If the mode changes from a mode with one transport block to a mode with two transport blocks, the procedure proceeds to block 820. In block 820 the buffer is kept for the first transport block and the MAC is instructed to consider the next transmission of a second transport block for each downlink HARQ process to be the very first transmission for that transport block.

From block 820 the procedure proceeds back to block 812 and continues to check for a transmission mode change.

If, in the check of block 814, it is determined that the transmission mode change was not from a mode with one transport block to a mode with two transport blocks, the procedure proceeds to block 830. In block 830, a check is made to determine whether the change in the transmission mode was from a mode that has two transport blocks per downlink HARQ process to a mode with one transport block. If yes, the procedure proceeds to block 832 and discards the buffered soft bits for the second transport block.

From block 832, the procedure proceeds back to block 812 and continues to check for a transmission mode change.

From block 830, if the transmission mode change was not from a mode with two transport blocks to a mode with one transport block then, when combining the checks in block 814 and block 830, the transmission mode change must have been from a mode in which there was one transport block to another mode with which there was one transport block, or a transmission mode in which there were two transport blocks to another transmission mode in which there were two transport blocks. In this case, the procedure proceeds back to block 812 and continues to check for a further transmission mode change since no buffers need to be flushed and no bits need to be discarded.

As will be appreciated by those skilled in the art, the checks of blocks 814 and 830 could be performed in separate procedures and in some cases the check of either of blocks 814 or 830 could be excluded.

Figure 8A:
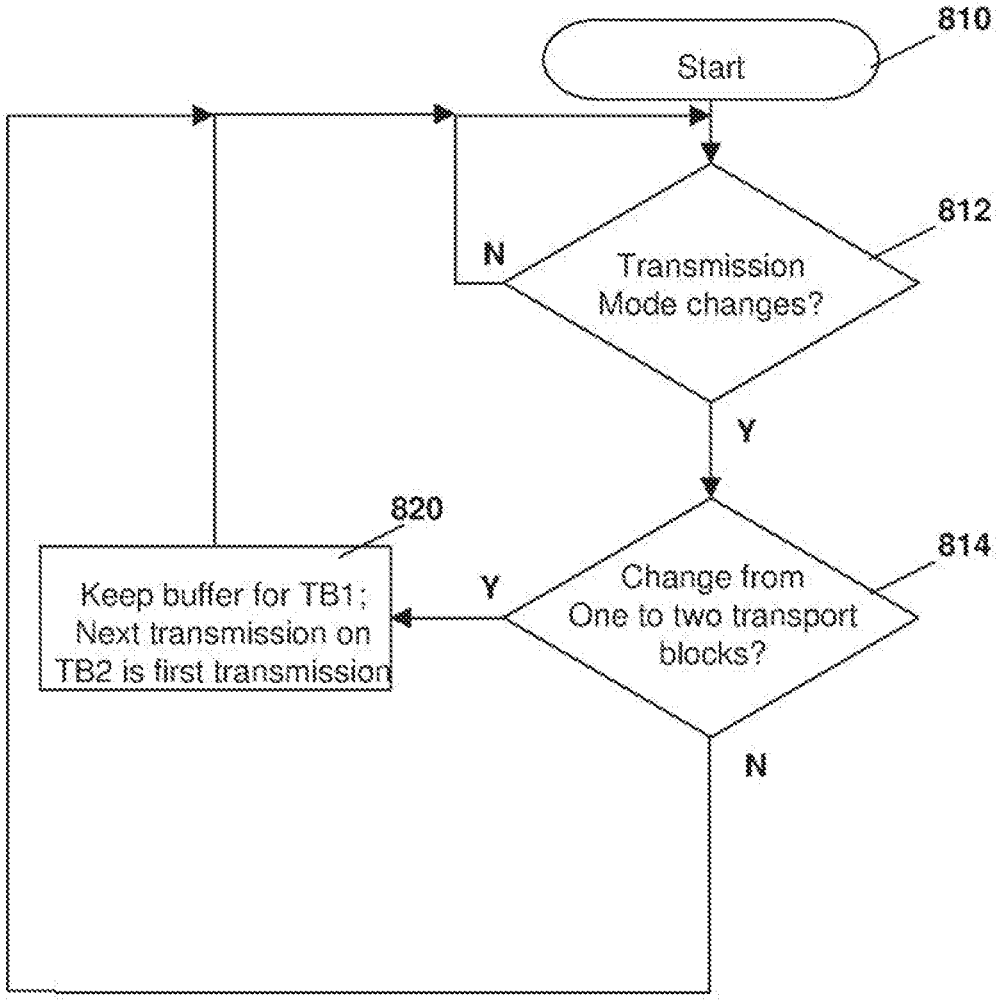
FIG. 8A is a flowchart showing the retention of used soft bits on transition between transmission modes with different numbers of transport blocks.

Reference is now made to FIG. 8A. In the procedure of FIG. 8A, the check of block 830 has been eliminated.

Specifically, the procedure of FIG. 8A starts at block 810 and proceeds to block 812 in which a check is made to determine whether a transmission mode change has occurred. If no, the procedure continues to check for a transmission mode change at block 812.

Once a transmission mode change has been detected at block 812, the procedure proceeds to block 814 in which a check is made to determine whether the transmission mode change was from a transmission mode having one transport block to a transmission mode having two transport blocks. If yes, the procedure proceeds to block 820 in which the buffer for the first transport block is kept and the next transmission on the second transport block is considered to be the first transmission on that transmission block. From block 820, the procedure proceeds back to block 812 to continue checking for further transmission mode changes.

From block 814, if the change was not from a transmission mode having one transport block to a transmission mode having two transport blocks, the procedure proceeds back to block 812 to continue checking for further transmission mode changes.

Conversely, if block 814 is eliminated from the procedure of FIG. 8, the procedure would then be the same as that of FIG. 4B described above.

UE Implemented Solution

As will be appreciated by those skilled in the art, any of the above may be implemented by making the changes to the 3GPP TS 36.331 specifications. Alternatively, since a complete failure of operations at the mobile device is not expected based on the transmission mode change, a further alternative embodiment would be to leave the choice of which solution to implement up to a UE manufacturer. In other words, the UE manufacturer could choose to implement the procedure of FIG. 2, 3, 4, 4A, 4B, 5, 5A, 8 or 8A. As will be appreciated by those in the art, such an implementation would require no changes in any Release 8 LTE specifications.

eNB Scheduling During a Transmission Mode Change

A further item that is unclear with current specifications is the exact timing of the transmission mode change at a UE. Specifically, the activation time of a downlink transmission mode reconfiguration cannot be specified in E-UTRA.

The E-UTRA RRC does not support the specification of an exact activation time in reconfiguration procedures. If a new mode of downlink transmission is applied by the eNB earlier than the time when the UE completes reconfiguration, reception of the data by the UE may fail. Similarly, if the old downlink transmission mode continues to be applied by the eNB after the time when the UE completes reconfiguration, reception of the data by the UE may also fail.

As will be appreciated, when transmission of one or two transport blocks to a downlink HARQ process occurs before the transmission mode change, and an HARQ transmission to the same downlink process occurs after the transmission mode change, if the number of transport blocks per downlink HARQ process has changed there may be a problem with the receipt of the transport block data.

If the downlink transmission mode is reconfigured and the maximum number of transport blocks that can be received in the subframe remains the same, then a retransmission to a downlink HARQ process can be handled following the transmission mode change, since there are no modifications to the downlink HARQ buffer size or to the number of NDI flags associated with each downlink HARQ process. However, if the transmission mode reconfiguration results in a change in the maximum number of transport blocks that can be received within a subframe, then the handling of a retransmission to a downlink HARQ process is potentially ambiguous according to the current E-UTRA specifications. For example, if the transmission mode changes from one of transmission mode 1, 2, 5, 6 or 7 to one of transmission mode 3 or 4, then combining of a new retransmission with the previous buffered soft bits may not occur correctly unless the reconfiguration of and transmission to the downlink HARQ buffer memory is handled properly. As a result reception of retransmitted data may fail and degrade the overall data transmission rate.

Reference is made to Table 3 below. Table 3 shows downlink control information (DCI) formats that are addressed to the C-RNTI (Cell Radio Network Temporary Identifier) of a UE that the UE is expected to be able to receive on the physical downlink control channel (PDCCH) while in each transmission mode.

TABLE 3

Downlink-related DCI formats (addressed to the UE's C-RNTI) to be received for each configured downlink transmission mode

| Transmission Mode | DL DCI Formats |
|---|---|
| 1 | 1A<br>1 |
| 2 | 1A<br>1 |
| 3 | 1A<br>2A |
| 4 | 1A<br>2 |
| 5 | 1A<br>1D |
| 6 | 1A<br>1B |
| 7 | 1A<br>1 |

As seen in Table 3 above, each transmission mode has various downlink DCI formats. In particular, the number underneath the format indicates the maximum number of transport blocks per transmission opportunity while a letter may be used to specify decoding procedures including modulation, code rate, physical resources, NDI flag, HARQ process number among other factors.

As can be seen from Table 3, the UE may expect to receive a DCI format 1A and one other downlink DCI format while in each transmission mode. The latter downlink DCI format varies from one transmission mode to another but DCI format 1A is common to all transmission modes.

Consequently, in one embodiment of the present disclosure an eNB may be required to use DCI format 1A for downlink transmission to a UE in the immediate time periods surrounding a transmission mode change at the UE, since the exact timing of the transmission mode change is unknown to the eNB, but the eNB does know that the UE will be able to receive DCI format 1A in both the old and new transmission modes.

Figure 9:
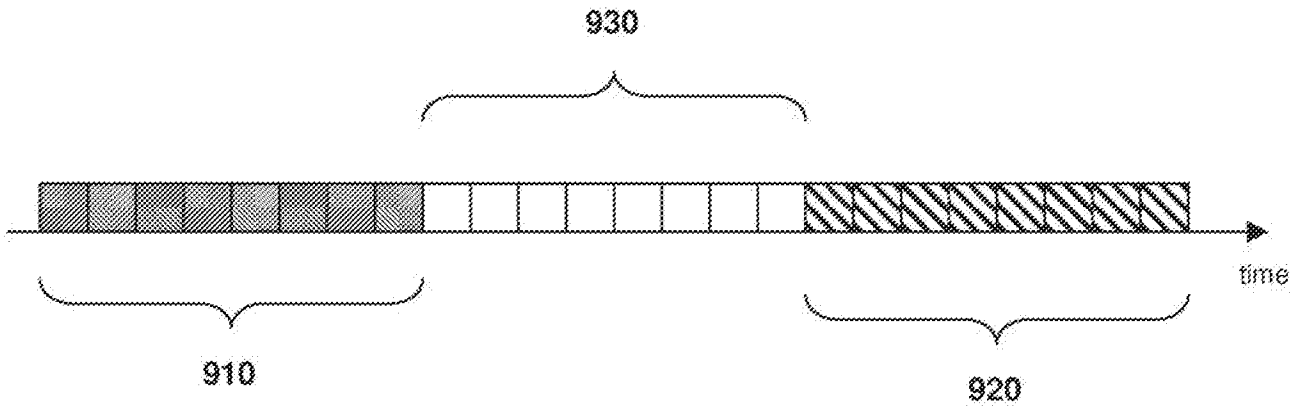
FIG. 9 is a timing diagram showing DCI formats used during transitioning between transport modes.

Reference is now made to FIG. 9. FIG. 9 provides an example in which a transition is made from, for example, transmission mode 4 in which DCI 2 would normally be used, to transmission mode 2 in which DCI 1 would normally be used.

Prior to ordering a transmission mode change, the eNB can use DCI 2 to transmit to the UE. However, uncertainty surrounding the actual transmission mode change to the UE is reflected in a time window when the eNB is not sure of which of the two transmission modes the UE will be configured in. Consequently, the eNB can use DCI 1A during this uncertainty window and still be sure that the UE will be able to receive the corresponding transmissions. Following the transmission mode change window, the eNB can then use DCI 1 which is part of transmission mode 2 to transmit to the UE.

Referring to FIG. 9, the time period prior to transmission mode change is labeled using reference numeral 910. The time period after the transmission mode change is labeled as reference numeral 920. The uncertainty window for the transmission mode change is labeled with reference numeral 930.

In the example of FIG. 9, the UE may be in transmission mode 4 within the region labeled with reference numeral 910. In this region, as seen from Table 3 above, the DCI utilized is normally DCI 2.

The UE may be in transmission mode 1 in the region labeled with reference numeral 920. In this region, as seen from Table 3 above, the DCI normally used is DCI 1.

In the uncertainty window 930 the eNB may transmit using DCI 1A, ensuring that the UE is able to decode the data that is provided during the uncertainty period.

Further, since the eNB knows, within period 910, that a transition to a new transmission mode is occurring, the eNB can further start to disable transport block 2 in the area of 910 as the subframes in the area of 910 approach the uncertainty window of 930. This will ensure that there are no or few active soft bits in any transport block buffer associated with transport block number 2.

As will be appreciated by those in the art, the example of FIG. 9 is merely meant to be illustrative and is not limiting. In particular, the number of subframes shown in each of the transition areas including uncertainty area 930 is not meant to be fixed to the number of subframes illustrated. Rather, the number of subframes illustrated is merely an example, and the actual window lengths may differ from those shown.

Further, if more than two transport blocks exists, the eNB could start to disable transmission on the second and any subsequent transport blocks prior to the uncertainty window. In the more general case, if the downlink transmission mode change is from a transmission mode with M transport blocks per transmission opportunity to a different transmission mode with N transport blocks, where $M \neq N$, then the eNB could ensure that only min(M,N) transport blocks are transmitted to the UE per transmission opportunity in the time period leading up to the transmission mode change uncertainty window.

In an alternative embodiment, the eNB can make no downlink transmissions and/or retransmissions during the transmission mode uncertainty window. In some situations, however, sending no transmissions might be difficult during periods of heavy downlink traffic without a noticeable degradation of data transmission rates.

The specification for 3GPP TS 36.331 may be changed to accommodate the transmission mode DCI utilization described above. In particular, the specification may be changed to read (new text is shown in boldface):

5.3.10.6 Physical Channel Reconfiguration

The UE shall:

1> reconfigure the physical channel configuration in accordance with the received physicalConfigDedicated;

1> if the antennaInfo is included and set to 'explicit Value':

2> if the configured transmissionMode is not 'tm3' or 'tm4' release ri-ConfigIndex in cqi-ReportPeriodic, if previously configured;

1> else if the antennaInfo is included and set to 'defaultValue':

2> release ri-ConfigIndex in cqi-ReportPeriodic, if previously configured;

Note: Prior to and during antenna mode reconfiguration the eNB shall transmit only one transport block in a subframe or the eNB shall not make any transmission on DRBs.

As seen above, the specification change includes a note that prior to and during the antenna mode reconfiguration the eNB shall transmit a maximum of only one transport block in a subframe or the eNB shall not make any transmission on data radio bearers.

Figure 10:
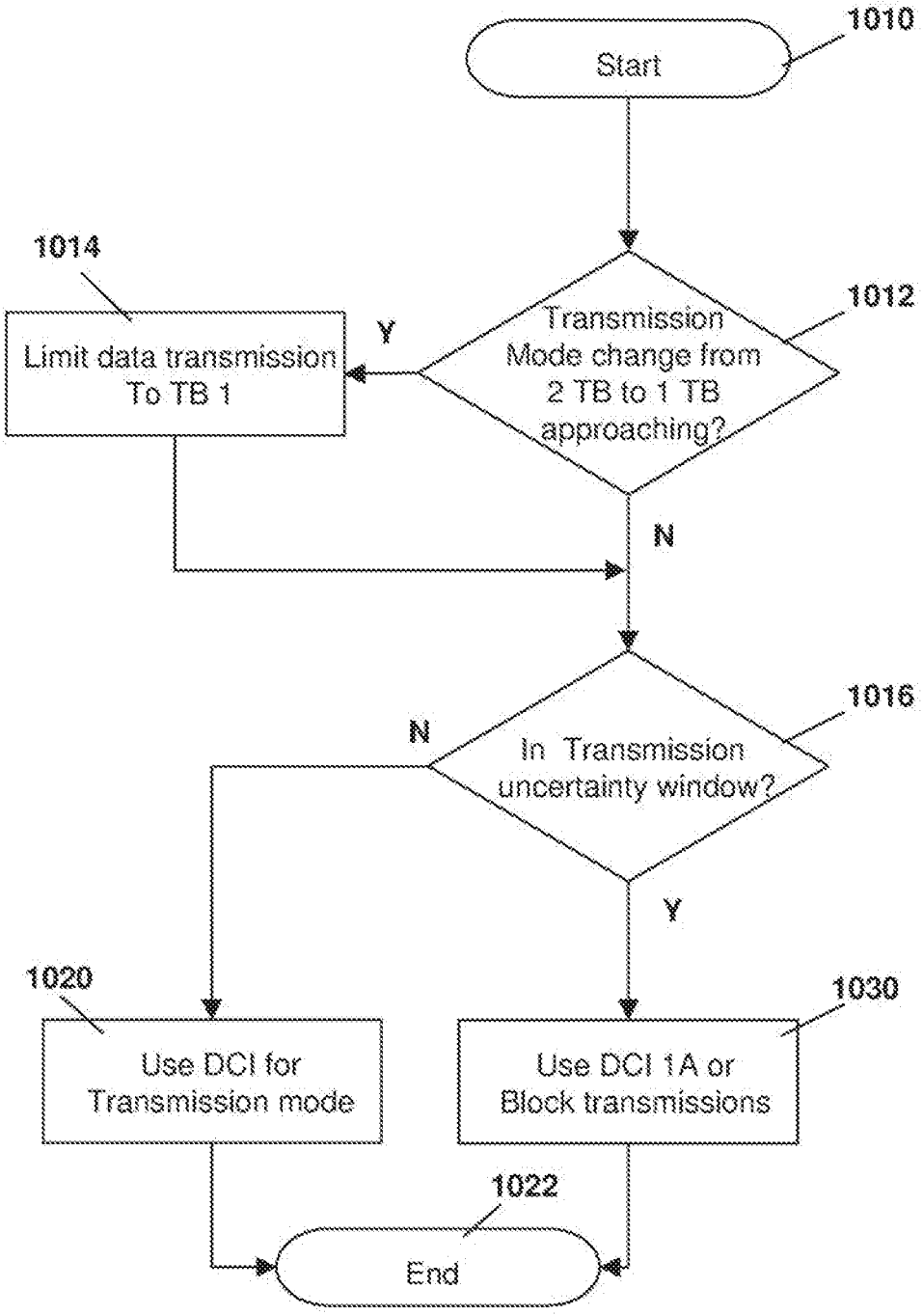
FIG. 10 is a flowchart showing the use of DCI format 1A or the blocking of transmission during an uncertainty window.

The embodiment is further illustrated with regard to FIG. 10. FIG. 10 shows a flow diagram of a procedure at the eNB for communication during a transmission mode change.

In particular, in the example of FIG. 10 the procedure starts at block 1010 and proceeds to block 1012 in which a check is made to determine whether a transmission mode changes from one where there are two transport blocks per downlink HARQ process to one where there is one transport block is approaching. If yes, the procedure proceeds to block 1014 and data transmission is limited to the first transmission block for each downlink HARQ process. The procedure then proceeds to 1016.

If there is no transmission mode change in which there are two transport blocks currently and one transport block after the change, then the procedure proceeds from block 1012 to 1016 as well.

As will be appreciated by those skilled in the art, blocks 1012 and 1014 are optional and do not necessarily need to be implemented.

In block 1016, a check is made to determine whether the transmission mode change is within the uncertainty window, as shown in FIG. 9. If, in block 1016 it is determined that the UE is in the transmission mode uncertainty window the procedure proceeds to block 1020 and the eNB uses either DCI 1A for data transmissions or else blocks data transmissions to the UE. The procedure then proceeds to block 1022 and ends.

From block 016, if the procedure is not in the transmission mode uncertainty window, the procedure proceeds to block 1030 in which the DCI format that is normally used for the transmission mode in which the UE is currently in (i.e. the DCI format (other than DCI 1A) from Table 3 for a particular transmission mode). The procedure then proceeds to block 1022 and ends.

Transport Block Sizing During a Transmission Mode Change Window

Having regard to FIGS. 6 and 7 above, these figures provide for the maintaining of existing soft buffer contents of a UE in a downlink HARQ process following a transmission mode change. However, one potential problem with the solution of FIGS. 6 and 7 is when the utilized portion exceeds the allocated buffer size when a buffer is divided in two or more. This may happen, for example, when moving from a single transport block transmission mode to a dual transport block transmission mode.

When two transport blocks are associated with each downlink HARQ process and one of the transport blocks is too large to fit within the available soft buffer memory for that transport block, some of the parity bits are not considered for transmission of that transport block. In other words, the eNB will automatically remove some of the parity bits during the rate matching procedure, as described in section 5.1.4.1.2 of 3GPP TS 36.212. These parity bits will never be transmitted.

The UE knows that these parity bits will never be transmitted and performs its forward error correction (FEC) decoding appropriately.

Figure 11:
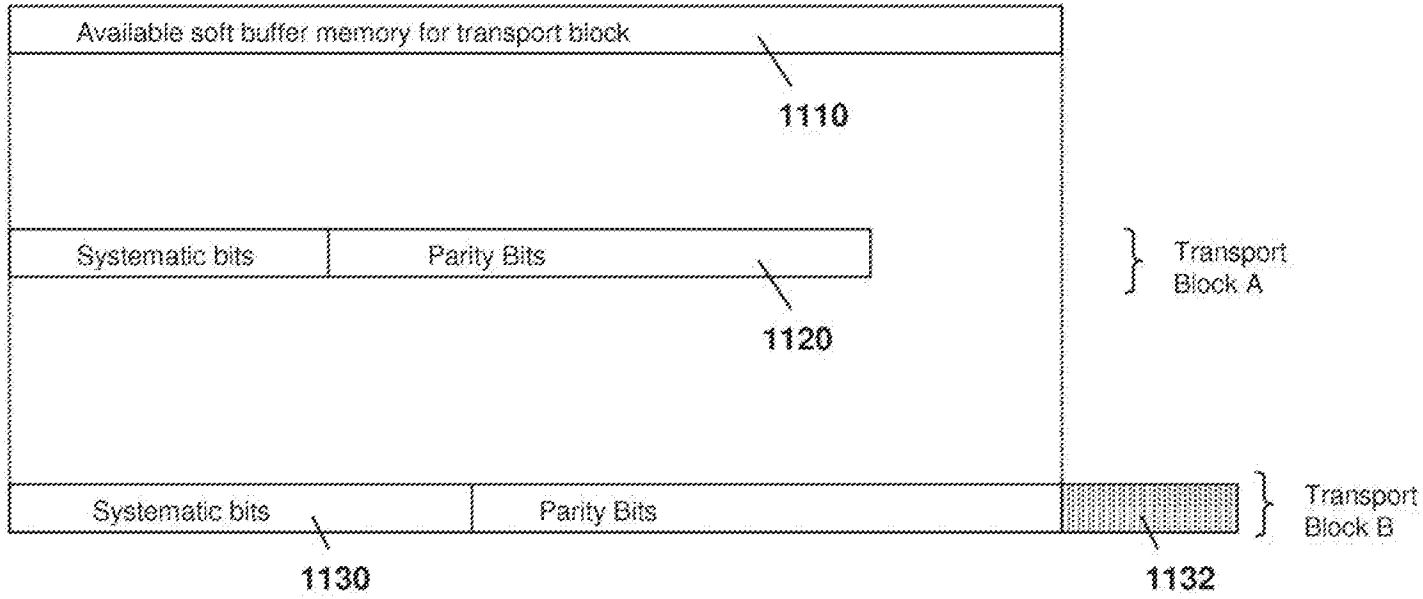
FIG. 11 is a block diagram showing truncation of parity bits for a large transport block.

Reference is now made to FIG. 11. FIG. 11 shows a soft buffer memory usage for two transport blocks. As seen with reference numeral 1110, the available soft buffer memory for a transport block is of a specific size.

In a first transport block 1120 the systematic bits and parity bits all fit within the memory size 1110. Conversely, in a second transport block 1130, the systematic bits and parity bits do not fit into the soft buffer memory 1110. The excess parity bits, as shown with reference numeral 1132 are thus never transmitted for transport block B.

Where an issue may exist is when the transmission mode change alters the number of transport blocks associated with each downlink HARQ process, as shown above with regard to FIGS. 6 and 7. If a transport block that is being retained for possible HARQ retransmission following the transmission mode change is too large, then the corresponding soft buffer contents for that transport block may become ambiguous. The eNB does not know the exact point in time at which the transmission mode will be changed by the UE, as seen above with regard to FIG. 9. Consequently, a situation may arise where the eNB wishes to perform a retransmission of a large transport block but does not know whether or not to include the extra parity bits that would otherwise be truncated for the case of two transport blocks per downlink HARQ process.

Figure 12:
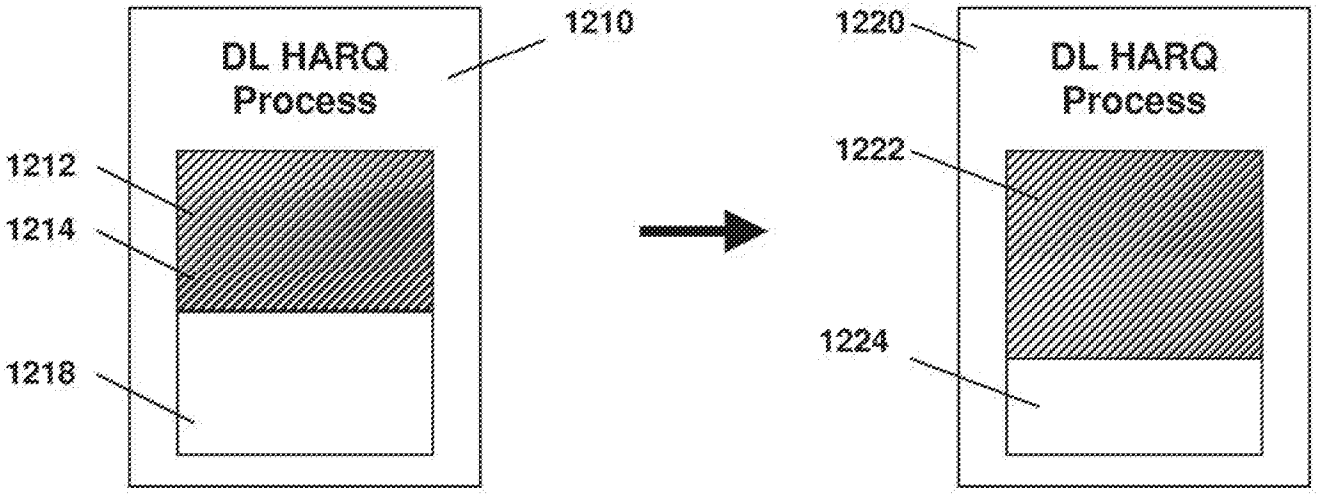
FIG. 12 is a block diagram showing the expansion of a transport block when transitioning from a mode with two transport blocks to a mode with one transport block.

Reference is now made to FIG. 12. FIG. 12 shows a transmission mode change from two transport blocks 1212 and 1218 per downlink HARQ process, to a single transport block 1224. In this case, the soft buffer contents 1214 for the first transport block 1210 may require expanding for the single transport block soft buffer contents 1222. For simplicity, only the first transport block is shown when two transport blocks are associated with each downlink HARQ process.

Thus, in FIG. 12, the transmission mode change occurs with a change from two transport blocks to one transport block per downlink HARQ process. However, the buffered transport block is sufficiently large that some of its parity bits were originally truncated in order to fit within the available soft buffer memory. When only one transport block is associated with each downlink HARQ process, these truncated parity bits would then be transmitted by the eNB, so the UE would insert zeros or null values into the appropriate bit locations (corresponding to the truncated or punctured parity bit positions) while expanding the buffered transport block, as shown by reference numeral 1222.

Figure 13:
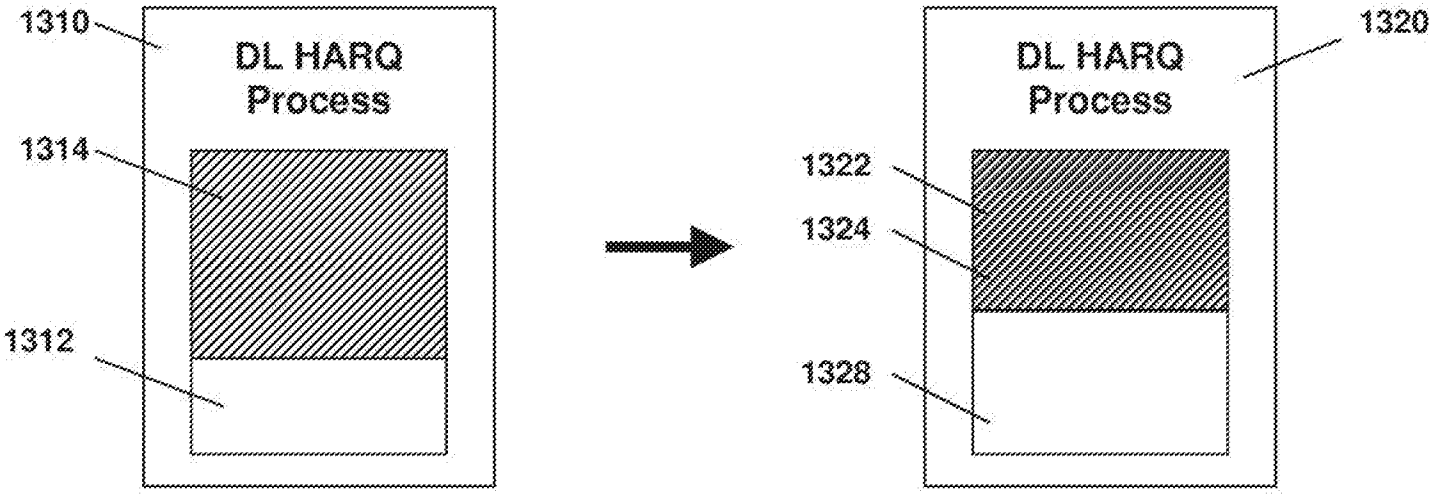
FIG. 13 is a block diagram showing the truncation of a transport block when transitioning from a mode with one transport block to a mode with two transport blocks.

Referring to FIG. 13, a similar but reverse procedure occurs when a transmission mode changes from one transport block to two transport blocks per downlink HARQ process. If the buffered transport block is too large, it may be necessary to compact the buffered transport block by removing or puncturing some of the soft bit values since the corresponding parity bits would never be transmitted in the two transport blocks per downlink HARQ process scenario. An issue arises when the UE may have performed the expansion or contraction of the buffer soft bit values when the transmission mode changeover is applied, but the eNB does not know exactly when the action was performed, so the eNB does not know whether or not to transmit any extra parity bits that would normally be discarded for the case of two transport blocks per downlink HARQ process.

Referring to FIG. 13, a single transport block downlink HARQ process is shown at reference numeral 1310 with soft buffer memory 1312 and a buffered transport block 1314. A dual transport block downlink HARQ process is shown at reference numeral 1320 with transport block soft buffers 1322 and 1328. As seen in the downlink HARQ process 1320, the extra parity bits from soft bit values 1314 are truncated or punctured for the first transport block's soft bit values 1324.

A number of solutions to the above issues may exist. In a first solution, the downlink HARQ buffer at the UE may be flushed when a transmission mode change occurs that results in a change in the number of transport blocks per downlink HARQ process, as described above with regard to FIG. 2. The eNB then avoids any downlink transmissions to the UE during the transmission change uncertainty window.

In an alternative embodiment, the eNB ensures that any transport blocks that are transmitted or retransmitted during the transmission mode change uncertainty window have a sufficiently small size so that there is no need to truncate or puncture any of the parity bits when two transport blocks per downlink HARQ process are used. If any excessively large transport blocks are buffered at the UE when a transmission mode change order is issued by the eNB, then the eNB may have to manually flush those transport blocks from the UE's downlink HARQ soft buffers by toggling the NDI flag for the associated transport blocks.

A further solution to the issue above is that the UE may be able to puncture some of the received soft bits from the large transport block and still perform the soft combining before the turbo decoding. As will be appreciated, the issue with the truncating of parity bits occurs when the eNB transmits a larger transport block than the UE can fit into its soft bit memory for the case of two transport blocks per downlink HARQ process. The UE however, has all the relevant transmission resource parameters such as MCS (Modulation & Coding Scheme), RV (Redundancy Version) among others. The MCS specifies the modulation level (e.g. QPSK, 16QAM, 64QAM) and code rate that are used for a particular transmission. The redundancy version specifies which exact set of systematic and/or parity bits are being sent in a particular transmission.

In a further embodiment, a particular downlink HARQ process could be flushed at the UE when a transmission mode change occurs only when all of the following conditions are satisfied:

1) The transmission mode reconfiguration involves a change in the number of transport blocks per downlink HARQ downlink process; and
2) The transport block size of at least one transport block contained in that downlink HARQ process' soft buffer is such that the number of transmitted parity bits changes as a result of the soft buffer memory repartitioning.

In the solution above, the buffer will be flushed when the transport block size that requires truncation is contained within the downlink HARQ process' buffer.

Furthermore, for the case of switching from one transport block per downlink HARQ process to two transport blocks, a further solution is that a particular downlink HARQ process will not repartition the soft buffer memory until the current transport block is completed. That is, soft combining for the current transport block will continue while the eNB sends a DCI 1A or 2 or 2A with a non-toggled NDI flag. In the case of DCI 2 or 2A being used, the second transport block would need to be disabled as specified in Section 7.1.7.2 of TS36.213. As soon as the downlink HARQ process receives a DCI 1A with a toggled NDI, a DCI 2/2A with one transport block enabled and a toggled NDI, or a DCI 2/2A with both transport blocks enabled whether or not the NDI flag is toggled or not, the downlink HARQ process could automatically be flushed and the corresponding soft combining buffer will be repartitioned. This also addresses the potential problem of the transport block being too large for buffer repartitioning.

The specification may be changed by adding a note in 3GPP TS 36.331, section 5.3.10.6 as follows (new text is shown in boldface):

5.3.10.6 Physical Channel Reconfiguration

The UE shall:

1> reconfigure the physical channel configuration in accordance with the received physicalConfigDedicated;

1> if the antennaInfo is included and set to 'explicit Value':

2> if the configured transmissionMode is not 'tm3' or 'tm4' release ri-ConfigIndex in cqi-ReportPeriodic, if previously configured;

1> else if the antennaInfo is included and set to 'defaultValue':

2> release ri-ConfigIndex in cqi-ReportPeriodic, if previously configured;

Note: Prior to and during antenna mode reconfiguration the eNB shall transmit only one transport block in a subframe or the eNB shall not make any transmission on DRBs. The eNB shall also consider the soft buffer size of a DL HARQ process after the reconfiguration when selecting a transport block size.

Applicability to LTE Advanced

In LTE Advanced, downlink MIMO may be enhanced to support 8×8 MIMO transmission. All of the above proposals are also applicable to LTE Advanced downlink. Moreover, LTE Advanced may also support MIMO transmissions in the uplink direction and there may consequently be multiple uplink transmission modes. These uplink transmission modes would be configured by RRC in a similar matter to the current LTE downlink transmission mode reconfiguration and therefore the proposals above are also applicable with regard to uplink transmissions. In one embodiment, the previously described proposals for downlink HARQ operation may be modified in order to address any transmission mode changeover timing issues and/or maintaining data transmission rates in the uplink direction. For example:

1) The eNB starts new transmissions by providing uplink grants with new data indications rather than HARQ retransmissions when the uplink transmission mode is reconfigured;

2) The eNB starts new transmissions by providing uplink grants with new data indications when the uplink transmission mode is reconfigured and the maximum number of transport blocks per uplink HARQ process is changed;

3) The eNB provides uplink grants only for one transport block per uplink HARQ process prior to and/or during the uplink transmission mode reconfiguration; and 4) In the more general case, if the uplink transmission mode change is from a transmission mode with M transport blocks per transmission opportunity to a different transmission mode with N transport blocks per transmission opportunity, where M≠N, then the eNB could ensure that transmission grants covering only min(M,N) transport blocks per transmission opportunity are provided to the UE in the time period leading up to the transmission mode change uncertainty window.

The above proposals are also applicable to E-UTRAN Release 9 specifications and may be applicable to other technology areas where multiple uplink or downlink transport blocks per transmission opportunity are provided and a transition between transmission modes exists where one or more transport blocks may be enabled or disabled.

Based on the above, if a transmission mode change is detected by the UE, the UE can manipulate the HARQ soft buffer by flushing the buffer, flushing the buffer only if the maximum number of transport blocks per HARQ process changes, flushing the HARQ buffer if the transmission mode changes from one with one transport block to two transport blocks per HARQ process and discarding the second transport block if the transition is from a mode with two transport blocks to a mode with one transport block, keeping a first transport block and initializing a second transport block when the transmission mode change is from a mode with one transport block to one with two transport blocks, The above can be implemented on any user equipment on the receiving side and any network element such as an evolved Node B on the sending side. On the sending side, the network element will include a communications subsystem to send the information concerning transport layers utilized.

Figure 14:
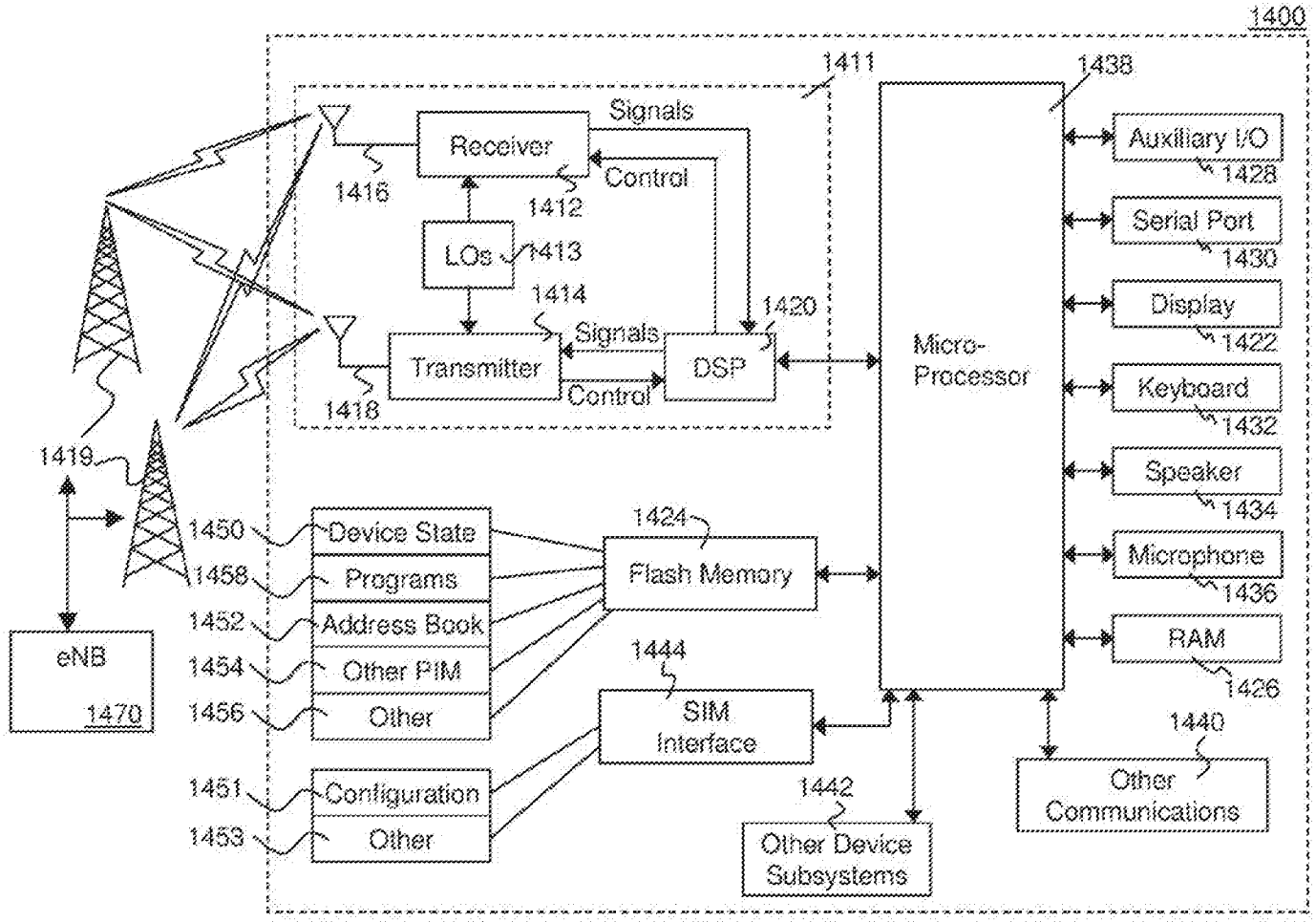
FIG. 14 is a block diagram of an exemplary user equipment.

For the UE side, FIG. 14 is a block diagram illustrating a UE capable of being used with preferred embodiments of the apparatus and method of the present application. Mobile device 1400 is preferably a two-way wireless communication device having at least voice communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 1400 is enabled for two-way communication, it will incorporate a communication subsystem 1411, including both a receiver 1412 and a transmitter 1414, as well as associated components such as one or more, preferably embedded or internal, antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the device is intended to operate.

Network access requirements will also vary depending upon the type of network 1419. An LTE UE may require a subscriber identity module (SIM) card in order to operate on the LTE or LTE-A network. The SIM interface 1444 is normally similar to a card-slot into which a SIM card can be inserted and ejected like a diskette or PCMCIA card. The SIM card may hold key configuration 1451, and other information 1453 such as identification, and subscriber related information.

When required network registration or activation procedures have been completed, UE 1400 may send and receive communication signals over the network 1419. As illustrated in FIG. 14, network 1419 can consist of multiple antennas communicating with the UE. These antennas are in turn connected to an eNB 1470.

Signals received by antenna 1416 through communication network 1419 are input to receiver 1412, which may perform such common receiver functions as signal amplification, frequency down conversion, filtering, channel selection and the like, and in the example system shown in FIG. 14, analog to digital (A/D) conversion. A/D conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog conversion, frequency up conversion, filtering, amplification and transmission over the communication network 1419 via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

UE 1400 preferably includes a microprocessor 1438 which controls the overall operation of the device. Communication functions, including data and voice communications, are performed through communication subsystem 1411. Microprocessor 1438 also interacts with further device subsystems such as the display 1422, flash memory 1424, random access memory (RAM) 1426, auxiliary input/output (I/O) subsystems 1428, serial port 1430, one or more keyboards or keypads 1432, speaker 1434, microphone 1436, other communication subsystems 1440 such as a short-range communications subsystem and any other device subsystems generally designated as 1442. Serial port 1430 could include a USB port or other port known to those in the art.

Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list.

Operating system software used by the microprocessor 1438 is generally stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. Microprocessor 1438, in addition to its operating system functions, preferably enables execution of software applications on the UE. A predetermined set of applications that control basic operations, including at least data and voice communication applications for example, will normally be installed on UE 1400 during manufacturing. Other applications could be installed subsequently or dynamically.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application would generally have the ability to send and receive data items, via the wireless network 1419. In one embodiment, the PIM data items are seamlessly integrated, synchronized and updated, via the wireless network 1419, with the UE user's corresponding data items stored or associated with a host computer system. Further applications may also be loaded onto the UE 1400 through the network 1419, an auxiliary I/O subsystem 1428, serial port 1430, short-range communications subsystem 1440 or any other suitable subsystem 1442, and installed by a user in the RAM 1426 or a non-volatile store (not shown) for execution by the microprocessor 1438. Such flexibility in application installation increases the functionality of the device and may provide enhanced on-device functions, communication-related functions, or both. For example, secure communication applications may enable electronic commerce functions and other such financial transactions to be performed using the UE 1400.

In a data communication mode, a received signal such as a text message or web page download will be processed by the communication subsystem 1411 and input to the microprocessor 1438, which preferably further processes the received signal for element attributes for output to the display 1422, or alternatively to an auxiliary I/O device 1428.

A user of UE 1400 may also compose data items such as email messages for example, using the keyboard 1432, which is preferably a complete alphanumeric keyboard or telephone-type keypad, in conjunction with the display 1422 and possibly an auxiliary I/O device 1428. Such composed items may then be transmitted over a communication network through the communication subsystem 1411.

For voice communications, overall operation of UE 1400 is similar, except that received signals would preferably be output to a speaker 1434 and signals for transmission would be generated by a microphone 1436. Alternative voice or audio I/O subsystems, such as a voice message recording subsystem, may also be implemented on UE 1400. Although voice or audio signal output is preferably accomplished primarily through the speaker 1434, display 1422 may also be used to provide an indication of the identity of a calling party, the duration of a voice call, or other voice call related information for example.

Serial port 1430 in FIG. 14 would normally be implemented in a personal digital assistant (PDA)-type UE for which synchronization with a user's desktop computer (not shown) may be desirable, but is an optional device component. Such a port 1430 would enable a user to set preferences through an external device or software application and would extend the capabilities of UE 1400 by providing for information or software downloads to UE 1400 other than through a wireless communication network. The alternate download path may for example be used to load an encryption key onto the device through a direct and thus reliable and trusted connection to thereby enable secure device communication. As will be appreciated by those skilled in the art, serial port 1430 can further be used to connect the UE to a computer to act as a modem.

Other communications subsystems 1440, such as a short-range communications subsystem, is a further component which may provide for communication between UE 1400 and different systems or devices, which need not necessarily be similar devices. For example, the subsystem 1440 may include an infrared device and associated circuits and components or a Bluetooth™ communication module to provide for communication with similarly enabled systems and devices. Subsystem 1440 may also be used for WiFi or WiMAX communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for handling hybrid automatic repeat request ('HARQ') operations at an user equipment in a wireless communications network during transmission mode changes, the method comprising:

detecting a *change of a* transmission mode[change], the transmission mode defining at least a maximum number of transport blocks per transmission opportunity;

[manipulating an HARQ process buffer;

wherein the HARQ process buffer is an uplink HARQ process buffer; and wherein an eNB provides] *receiving, from an eNB, an* uplink [grants only] *grant* for a maximum of a first number of transport blocks per [uplink HARQ process] *transmission opportunity* prior to, during or both prior to and during [an uplink] *the change of the* transmission mode[reconfiguration in which], *wherein the change of the transmission mode reduces* the maximum number of transport blocks per transmission opportunity [is reduced] from a second number of transport blocks to the first number of transport blocks, the second number of transport blocks being greater than the first number of transport blocks*; and*

*in response to the second number of transport blocks being greater than the first number of transport blocks, manipulating an HARQ process buffer, wherein the HARQ process buffer is an uplink HARQ process buffer*.

2. The method of claim 1, wherein the manipulating comprises flushing the HARQ process buffer.

3. The method of claim 1, wherein said manipulating comprises flushing the HARQ process buffer [only] if the *change of the* transmission mode [change] includes a change in the maximum number of transport blocks per transmission opportunity.

[4. The method of claim 1, wherein said manipulating comprises flushing the HARQ process buffer only if the transmission mode change includes a change from a transmission mode with a maximum of one transport block per transmission opportunity to a transmission mode with a maximum of more than one transport blocks per transmission opportunity.]

5. The method of claim 1, wherein said manipulating further comprises discarding [only] a second transport block if the *change of the* transmission mode [change] is from a transmission mode with a maximum of two transport blocks per transmission opportunity to a transmission mode with a maximum of one transport block per transmission opportunity.

6. The method of claim 1, wherein said manipulating further comprises discarding [only] a first transport block and handling soft bits from the second transport block as the first transport block if the *change of the* transmission mode [change] is from a transmission mode with a maximum of two transport blocks per transmission opportunity to a transmission mode with a maximum of one transport block per transmission opportunity and if [all] soft bits on the first transport block have been successfully decoded.

[7. The method of claim 1, wherein said manipulating comprises keeping a first number of transport blocks and initializing a second number of transport blocks when the transmission mode change includes a change from a transmission mode with a maximum number of transport blocks per transmission opportunity equal to the first number to a transmission mode with a maximum of transport blocks per transmission opportunity equal to the first number plus the second number.]

8. The method of claim 1, further comprising detecting when a transport block is smaller than a predetermined size, and if not, said manipulating comprising buffering or discarding the transport block.

9. The method of claim 1, wherein said manipulating comprises flushing a transport block if the *change of the* transmission mode [change] involves a change in the maximum number of transport blocks per transmission opportunity and if the transport block size is larger than a threshold.

[10. The method of claim 1, wherein the HARQ process buffer is a downlink HARQ process buffer.]

[11. The method of claim 1, wherein an eNB starts new transmissions by providing uplink grants with new data indications when an uplink transmission mode is reconfigured.]

[12. The method of claim 1, wherein an eNB starts new transmissions by providing uplink grants with new data indications when the uplink transmission mode is reconfigured and a maximum number of transport blocks per uplink HARQ process is changed.]

[13. The method of claim 1, wherein an eNB provides uplink grants only for a maximum of a first number of transport blocks per uplink HARQ process during an uplink transmission mode reconfiguration in which the maximum number of transport blocks per transmission opportunity is increased from the first number of transport blocks to a second number of transport blocks, the second number of transport blocks being greater than the first number of transport blocks.]

[14. An user equipment configured for handling hybrid automatic repeat request ('HARQ') operations during transmission mode changes comprising:

a processor; and a communications subsystem;

the processor and communications subsystem being configured to: detect a transmission mode change, the transmission mode defining at least a maximum number of transport blocks per transmission opportunity;

manipulate an HARQ process buffer; and to discard only a first transport block and handling soft bits from the second transport block as the first transport block if the transmission mode change is from a transmission mode with a maximum of two transport blocks per transmission opportunity to a transmission mode with a maximum of one transport block per transmission opportunity and if all soft bits on the first transport block have been successfully decoded.]

[15. The user equipment of claim 14, wherein the manipulating comprises flushing the HARQ process buffer.]

[16. The user equipment of claim 14, further configured to flush the HARQ process buffer only if the transmission mode change includes a change in the maximum number of transport blocks per transmission opportunity.]

[17. The user equipment of claim 14, further configured to flush the HARQ process buffer only if the transmission mode change includes a change from a transmission mode with a maximum of one transport block per transmission opportunity to a transmission mode with a maximum of more than one transport blocks per transmission opportunity.]

[18. The user equipment of claim 14, further configured to discard only a second transport block if the transmission mode change is from a transmission mode with a maximum of two transport blocks per transmission opportunity to a transmission mode with a maximum of one transport block per transmission opportunity.]

[19. The user equipment of claim 14, further configured to keep a first transport block and initialize a second or subsequent transport block when the transmission mode change includes a change from a transmission mode with a maximum of one transport block per transmission opportunity to a transmission mode with a maximum of more than one multiple transport blocks per transmission opportunity.]

[20. The user equipment of claim 14, further configured to detect when a transport block is smaller than a predetermined size, and if not, said manipulating comprising buffering or discarding the transport block.]

[21. The user equipment of claim 14, further configured to flush a transport block if the transmission mode change involves a change in the maximum number of transport blocks per transmission opportunity and if a size of the transport block is larger than a threshold.]

*22. A user equipment (UE), comprising:*

*at least one hardware processor; and*

*a non-transitory computer-readable storage medium coupled to the at least one hardware processor and storing programming instructions for execution by the at least one hardware processor, wherein the programming instructions, when executed, cause the UE to perform operations comprising:*

*detecting a change of a transmission mode, the transmission mode defining at least a maximum number of transport blocks per transmission opportunity;*

*receiving, from an eNB, an uplink grant for a maximum of a first number of transport blocks per transmission opportunity prior to, during or both prior to and during the change of the transmission mode, wherein the change of the transmission mode reduces the maximum number of transport blocks per transmission opportunity from a second number of transport blocks to the first number of transport blocks, the second number of transport blocks being greater than the first number of transport blocks; and*

*in response to the second number of transport blocks being greater than the first number of transport blocks, manipulating an hybrid automatic repeat request (HARQ) process buffer, wherein the HARQ process buffer is an uplink HARQ process buffer.*

*23. The UE of claim 22, wherein the manipulating comprises flushing the HARQ process buffer.*

*24. The UE of claim 22, wherein the manipulating comprises flushing the HARQ process buffer if the change of the transmission mode includes a change in the maximum number of transport blocks per transmission opportunity.*

*25. The UE of claim 22, wherein the manipulating further comprises discarding a second transport block if the change of the transmission mode is from a transmission mode with a maximum of two transport blocks per transmission opportunity to a transmission mode with a maximum of one transport block per transmission opportunity.*

*26. The UE of claim 22, wherein the manipulating further comprises discarding a first transport block and handling soft bits from the second transport block as the first transport block if the change of the transmission mode is from a transmission mode with a maximum of two transport blocks per transmission opportunity to a transmission mode with a maximum of one transport block per transmission opportunity and if soft bits on the first transport block have been successfully decoded.*

*27. The UE of claim 22, further comprising detecting when a transport block is smaller than a predetermined size, and if not, said manipulating comprising buffering or discarding the transport block.*

*28. The UE of claim 22, wherein said manipulating comprises flushing a transport block if the change of the transmission mode involves a change in the maximum number of transport blocks per transmission opportunity and if the transport block size is larger than a threshold.*

*29. A non-transitory computer-readable medium storing instructions which, when executed, cause a computing device to perform operations comprising:*

*detecting a change of a transmission mode, the transmission mode defining at least a maximum number of transport blocks per transmission opportunity;*

*receiving, from an eNB, an uplink grant for a maximum of a first number of transport blocks per transmission opportunity prior to, during or both prior to and during the change of the transmission mode, wherein the change of the transmission mode reduces the maximum number of transport blocks per transmission opportunity from a second number of transport blocks to the first number of transport blocks, the second number of transport blocks being greater than the first number of transport blocks; and*

*in response to the second number of transport blocks being greater than the first number of transport blocks, manipulating an hybrid automatic repeat request (HARQ) process buffer, wherein the HARQ process buffer is an uplink HARQ process buffer.*

*30. The non-transitory computer-readable medium of claim 29, wherein the manipulating comprises flushing the HARQ process buffer.*

*31. The non-transitory computer-readable medium of claim 29, wherein the manipulating comprises flushing the HARQ process buffer if the change of the transmission mode includes a change in the maximum number of transport blocks per transmission opportunity.*

*32. The non-transitory computer-readable medium of claim 29, wherein the manipulating further comprises discarding a second transport block if the change of the transmission mode is from a transmission mode with a maximum of two transport blocks per transmission opportunity to a transmission mode with a maximum of one transport block per transmission opportunity.*

*33. The non-transitory computer-readable medium of claim 29, wherein the manipulating further comprises discarding a first transport block and handling soft bits from the second transport block as the first transport block if the change of the transmission mode is from a transmission mode with a maximum of two transport blocks per transmission opportunity to a transmission mode with a maximum of one transport block per transmission opportunity and if soft bits on the first transport block have been successfully decoded.*

*34. The non-transitory computer-readable medium of claim 29, further comprising detecting when a transport block is smaller than a predetermined size, and if not, said manipulating comprising buffering or discarding the transport block.*

*35. The non-transitory computer-readable medium of claim 29, wherein said manipulating comprises flushing a transport block if the change of the transmission mode involves a change in the maximum number of transport*

*blocks per transmission opportunity and if the transport block size is larger than a threshold.*

* * * * *